(12) United States Patent
Iijima et al.

(10) Patent No.: US 10,541,086 B2
(45) Date of Patent: Jan. 21, 2020

(54) LAMINATED CERAMIC ELECTRONIC COMPONENT

(71) Applicant: TAIYO YUDEN CO., LTD., Taito-ku, Tokyo (JP)

(72) Inventors: Yoshiaki Iijima, Takasaki (JP); Sou Satou, Takasaki (JP); Yasutomo Suga, Takasaki (JP); Katsuo Koizumi, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 14/957,527

(22) Filed: Dec. 2, 2015

(65) Prior Publication Data

US 2016/0233027 A1     Aug. 11, 2016

(30) Foreign Application Priority Data

Dec. 5, 2014  (JP) .................................. 2014-246559
Mar. 31, 2015 (JP) .................................. 2015-071461

(51) Int. Cl.
*H01G 4/30* (2006.01)

(52) U.S. Cl.
CPC ..................................... *H01G 4/30* (2013.01)

(58) Field of Classification Search
CPC .......... H01G 4/30; H01G 4/012; H01G 4/232; H01G 4/38; H01G 4/005; H01G 4/12; H01G 4/228
See application file for complete search history.

(56) References Cited

U.S. PATENT DOCUMENTS

2009/0002920 A1*  1/2009  Itamura .................. H01G 4/232
                                                                    361/321.3
2009/0284896 A1   11/2009  Sakaguchi et al.
2012/0019981 A1*  1/2012  Yoshida ................ H01C 1/1406
                                                                    361/321.1
2012/0019982 A1*  1/2012  Sasaki .................... H01G 4/002
                                                                    361/321.1
2012/0188682 A1*  7/2012  Sato ........................ H01G 4/232
                                                                    361/305

(Continued)

FOREIGN PATENT DOCUMENTS

CN        101276687 A    10/2008
CN        102403123 A     4/2012

(Continued)

OTHER PUBLICATIONS

A First Office Action issued by the State Intellectual Property Office of China dated Jul. 25, 2017 for Chinese counterpart application No. 201510886446.3.

(Continued)

*Primary Examiner* — Nguyen T Ha
(74) *Attorney, Agent, or Firm* — Law Office of Katsuhiro Arai

(57) ABSTRACT

A laminated ceramic capacitor has a capacitor body of roughly a rectangular solid shape defined by the length, width, and height, as well as a concaved part formed at and along the edges of one side and the other side in the height direction. An external electrode has a base conductor layer whose height-direction wrap-around part is formed inside the concaved part, and a main conductor layer whose height-direction wrap-around part is formed continuously over the height-direction wrap-around part of the base conductor layer through the planar part, except for the concaved part, of one side and the other side of the component body in the height direction. The height-direction wrap-around part of the main conductor layer has a planar connecting area constituted by a surface area over the height-direction wrap-around part of the base conductor layer and a surface area over the planar part of the component body.

18 Claims, 19 Drawing Sheets

(56) References Cited

U.S. PATENT DOCUMENTS

| | | | | |
|---|---|---|---|---|
| 2013/0220696 A1* | 8/2013 | Otani | ................ | H01G 4/12 |
| | | | | 174/534 |
| 2013/0229748 A1* | 9/2013 | Chung | ............ | H01G 4/005 |
| | | | | 361/301.4 |
| 2013/0229749 A1* | 9/2013 | Lee | ............ | H01G 4/12 |
| | | | | 361/321.2 |
| 2013/0284507 A1* | 10/2013 | Hattori | ............ | H05K 1/18 |
| | | | | 174/260 |
| 2015/0114705 A1* | 4/2015 | Ahn | ............ | H01G 2/065 |
| | | | | 174/260 |
| 2016/0240310 A1* | 8/2016 | Kim | ............ | H01G 4/12 |

FOREIGN PATENT DOCUMENTS

| | | | | |
|---|---|---|---|---|
| CN | 103310977 A | 9/2013 | | |
| JP | 2004-200602 | * 1/2004 | ......... | H01G 4/30 |
| JP | 2009253010 A | 10/2009 | | |
| JP | 0005217584 B2 | 6/2013 | | |
| KR | 20130061260 A | 6/2013 | | |

OTHER PUBLICATIONS

A Second Office Action issued by the State Intellectual Property Office of China dated Feb. 24, 2018 for Chinese counterpart application No. 201510886446.3.

A Fourth Office Action issued by the State Intellectual Property Office of China dated Mar. 11, 2019 for Chinese counterpart application No. 201510886446.3. (3 pages).

A Third Office Action issued by the State Intellectual Property Office of China dated Aug. 24, 2018 for Chinese counterpart application No. 201510886446.3.

* cited by examiner

[Fig. 1]
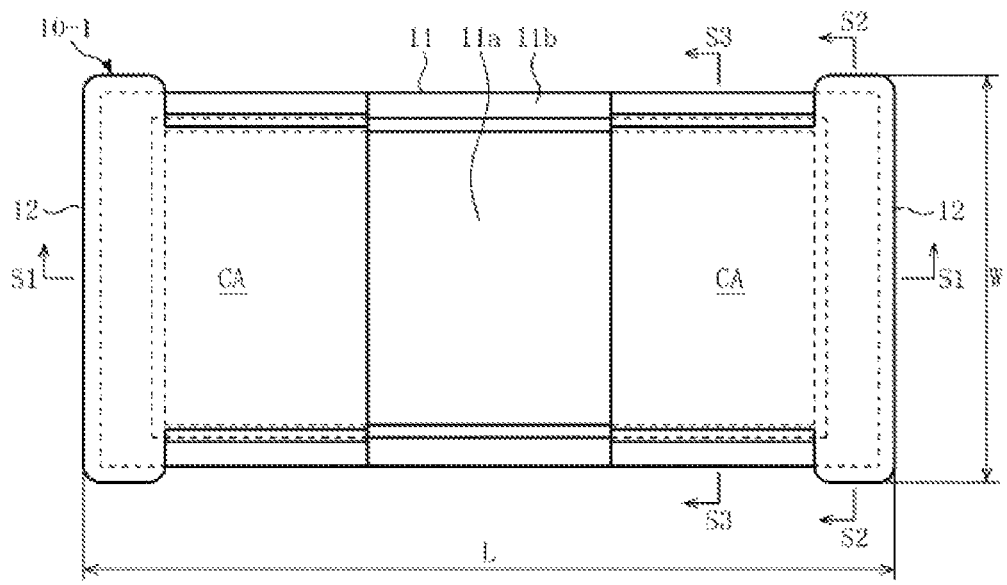
[Fig. 2]
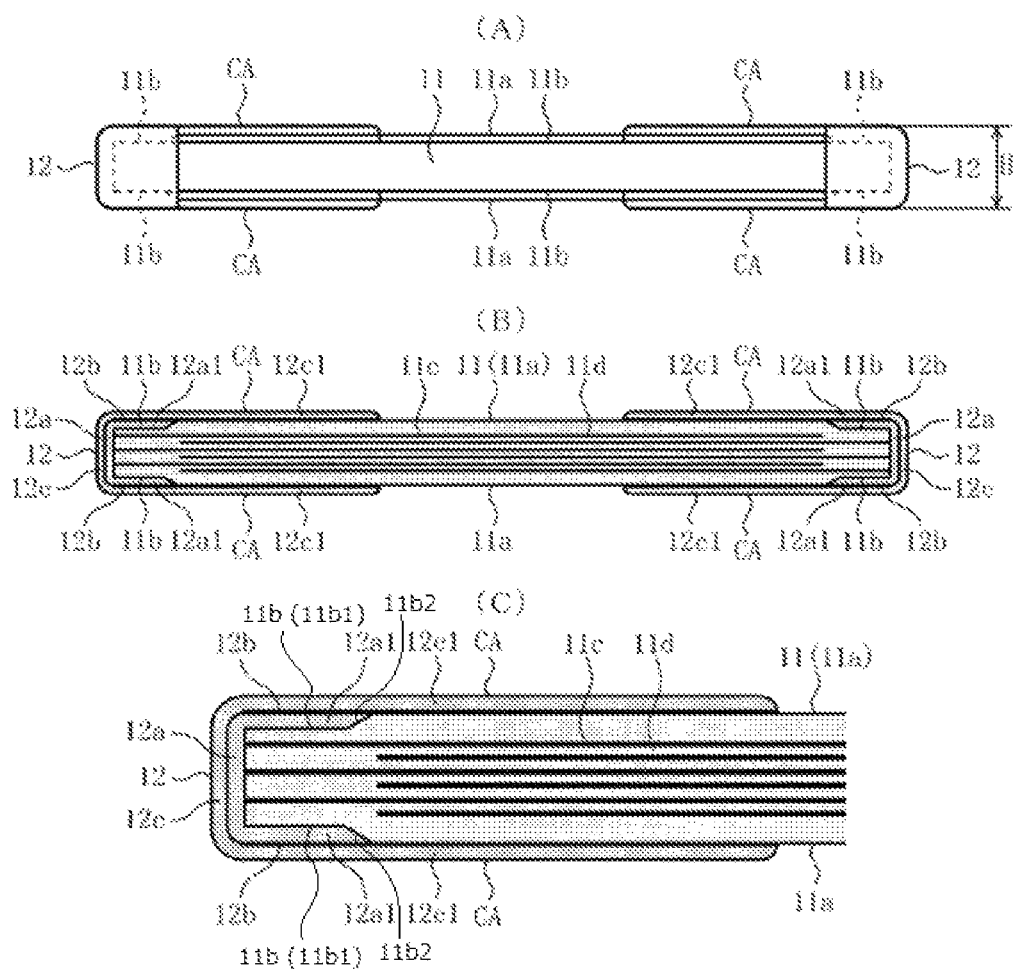

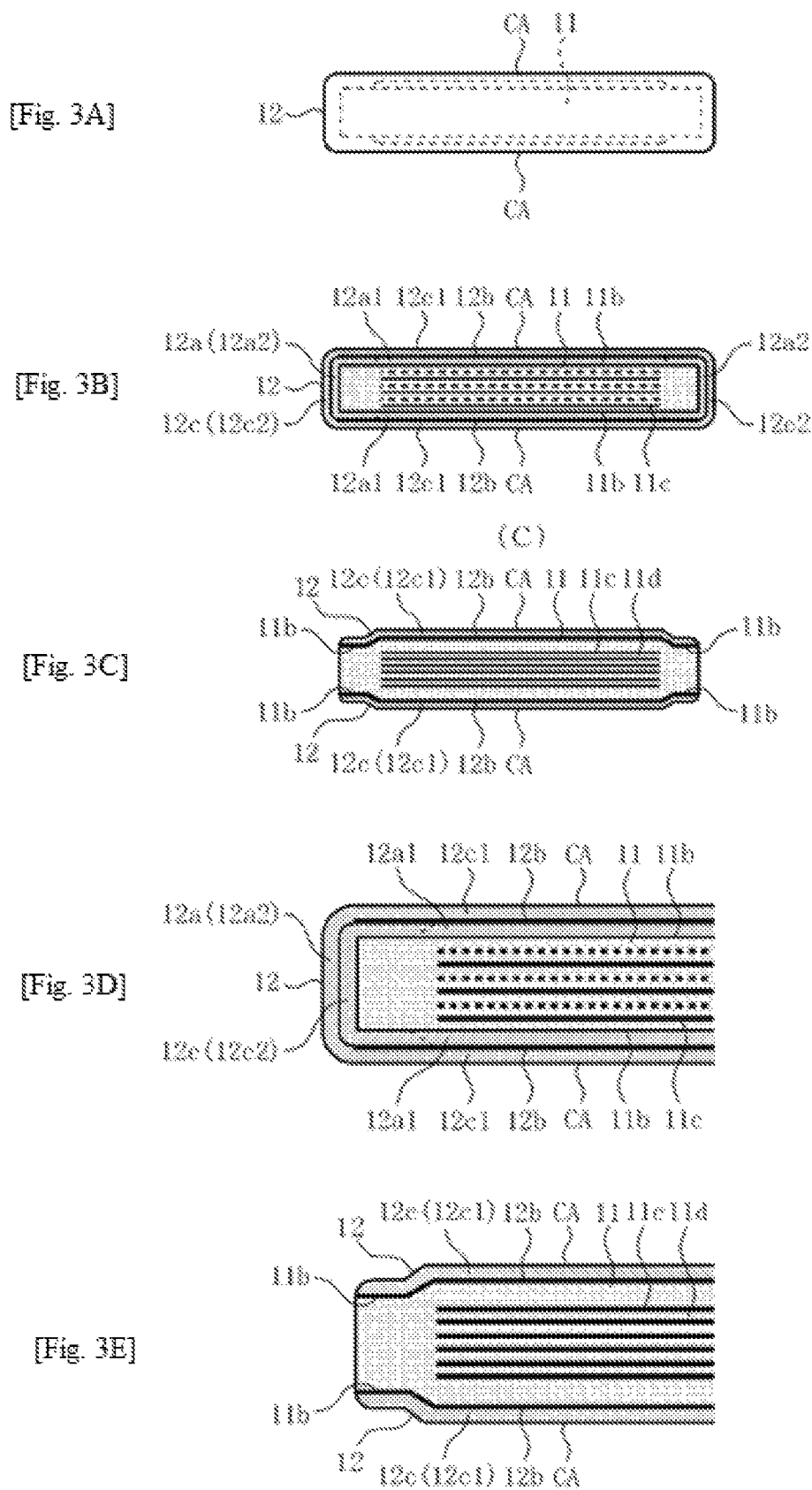

[Fig. 4]
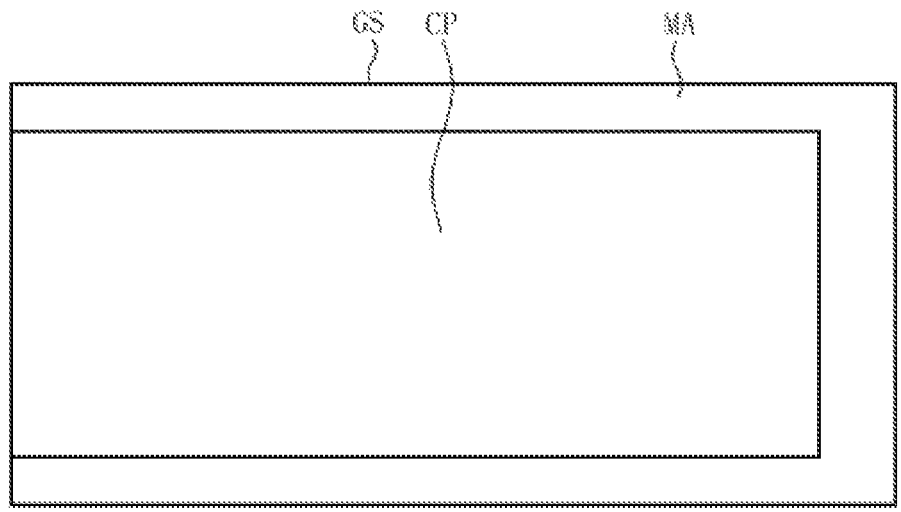
[Fig. 5A]
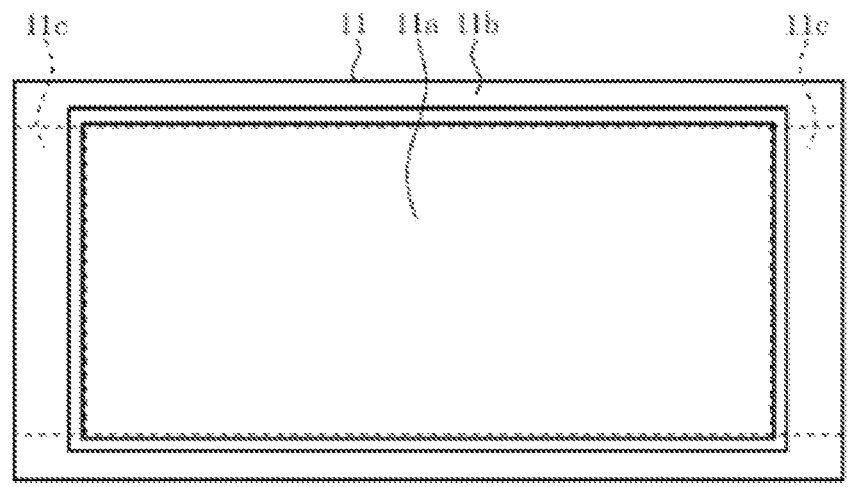
[Fig. 5B]
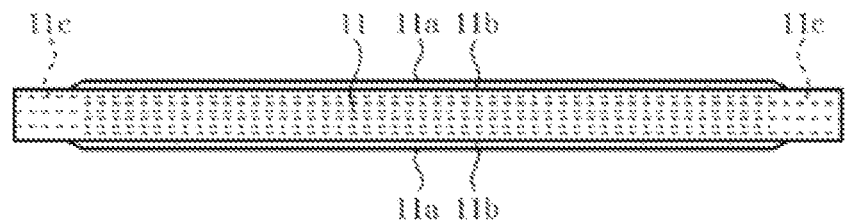

[Fig. 6]
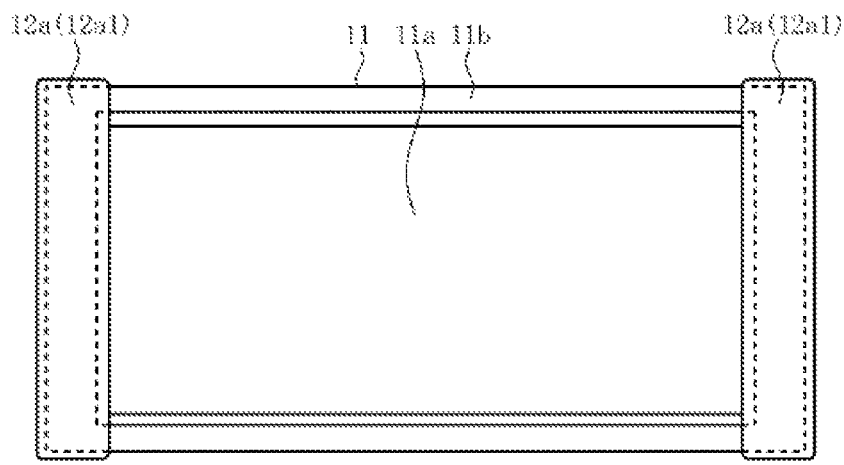
[Fig. 7]
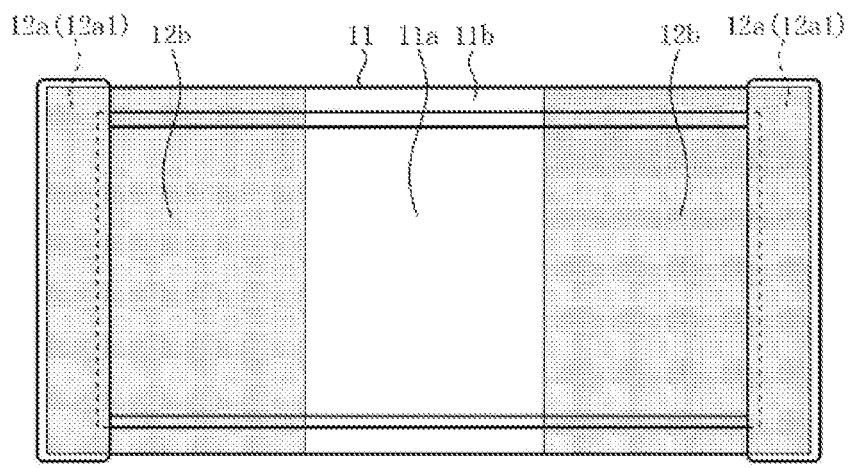
[Fig. 8A]
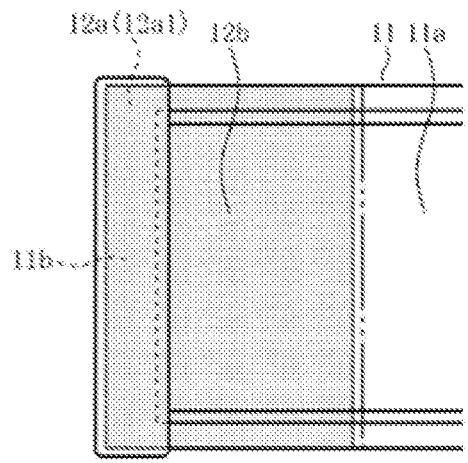
[Fig. 8B]
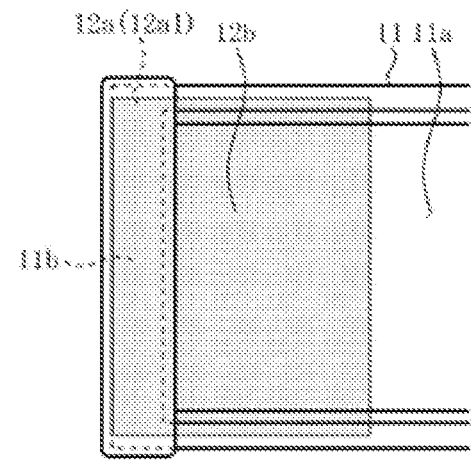

[Fig. 9]
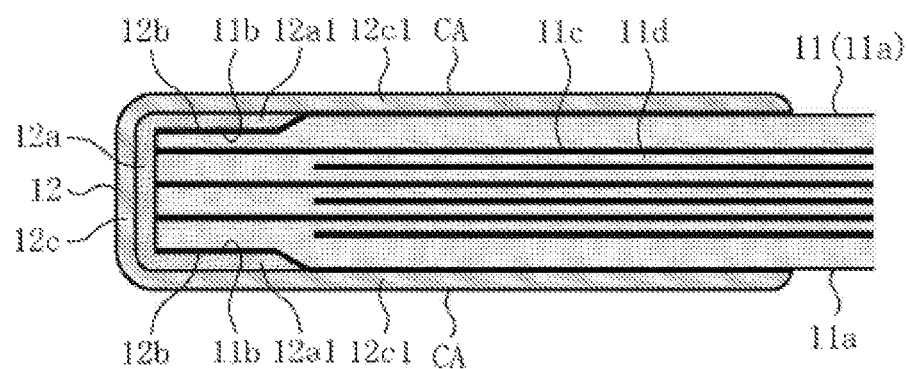
[Fig. 10]
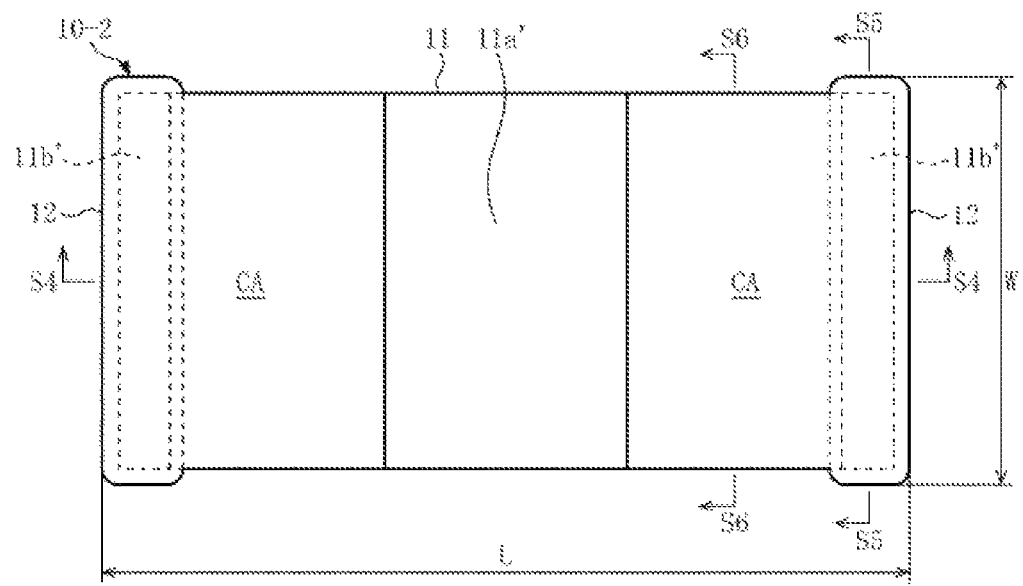

[Fig. 11]
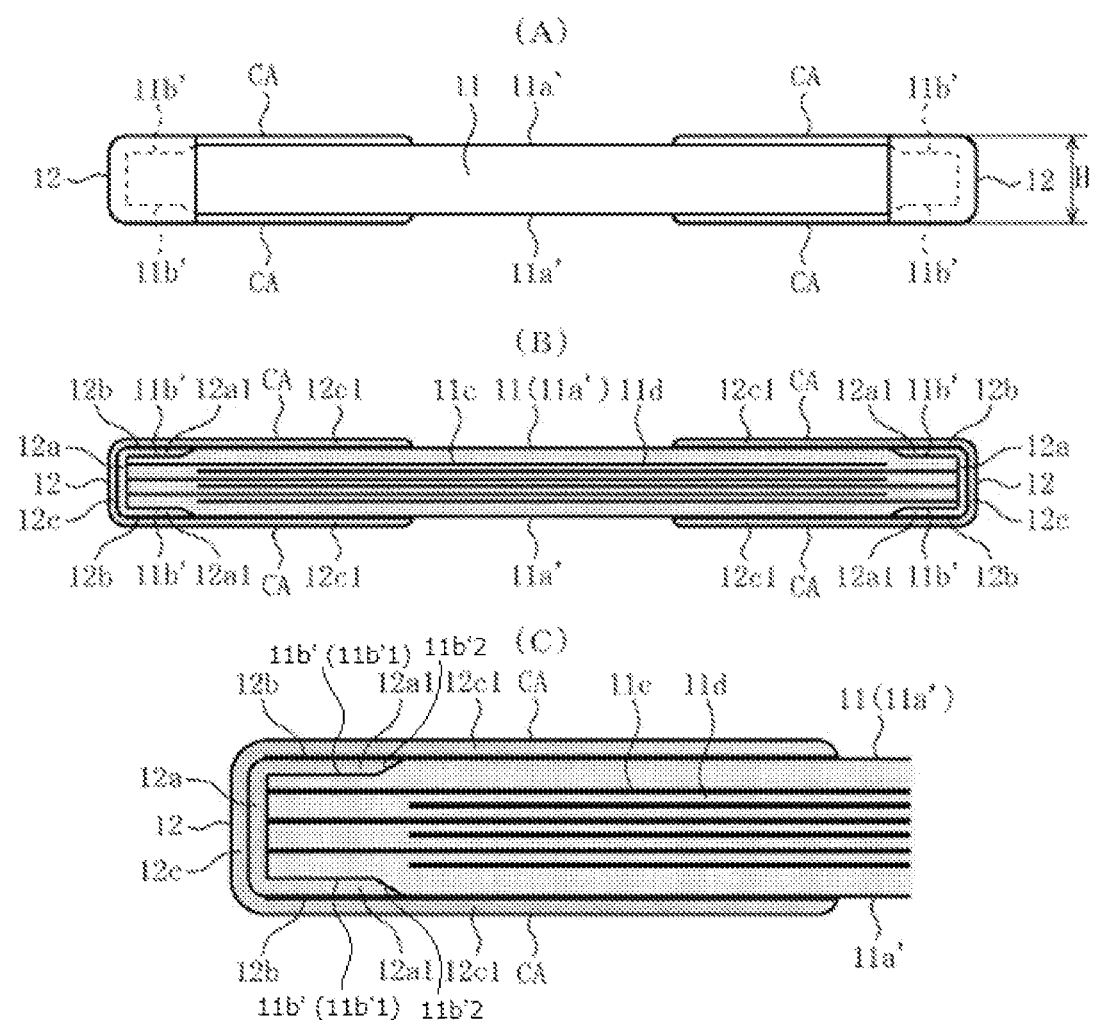

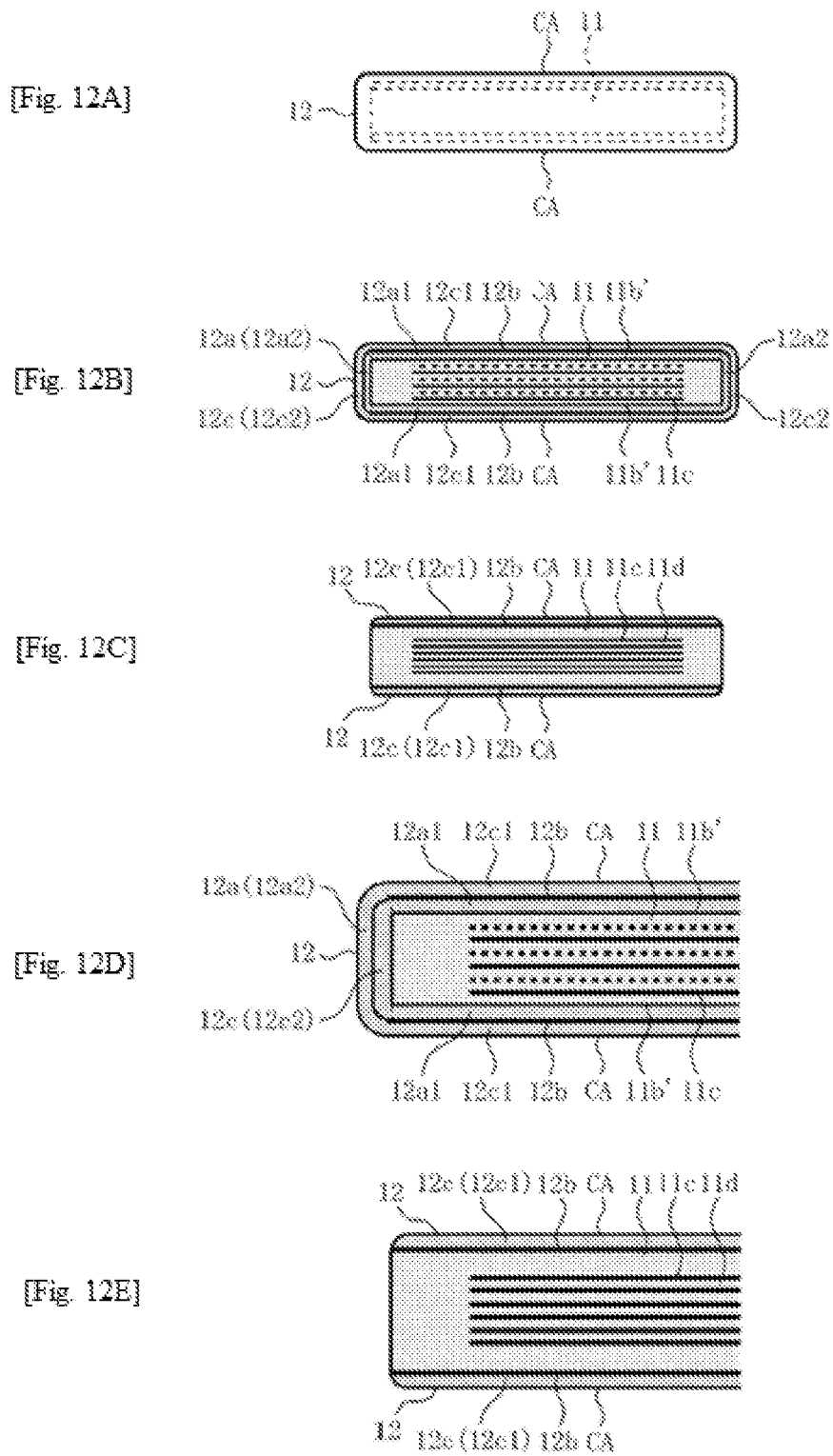

[Fig. 13]
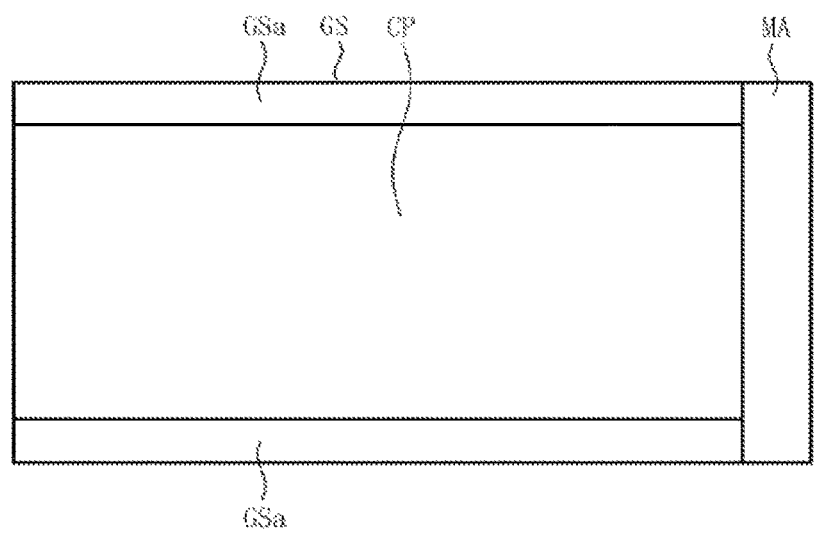
[Fig. 14A]
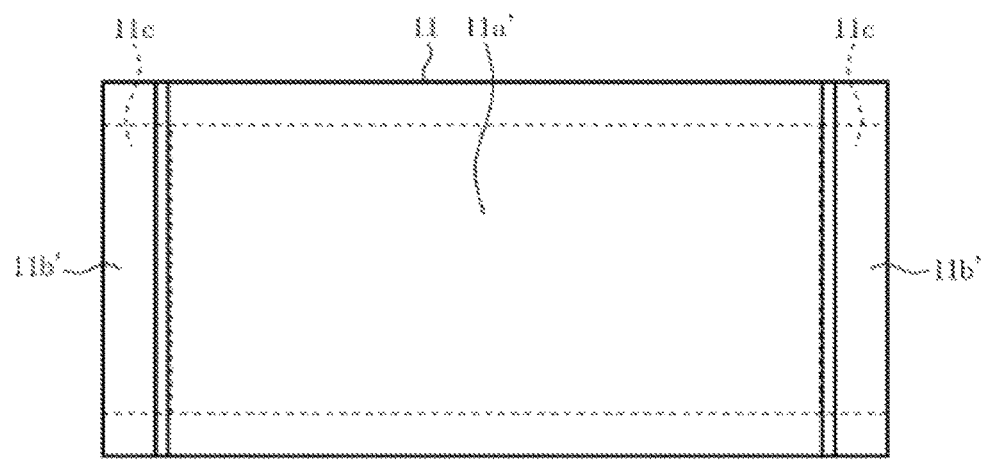
[Fig. 14B]
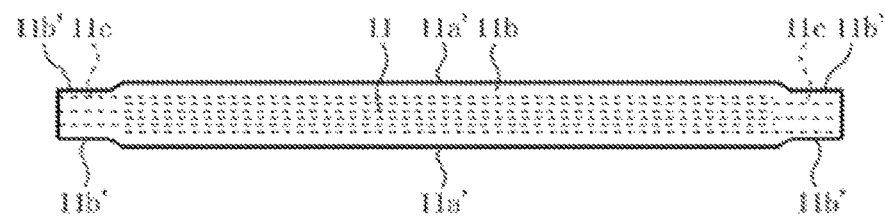

[Fig. 15]
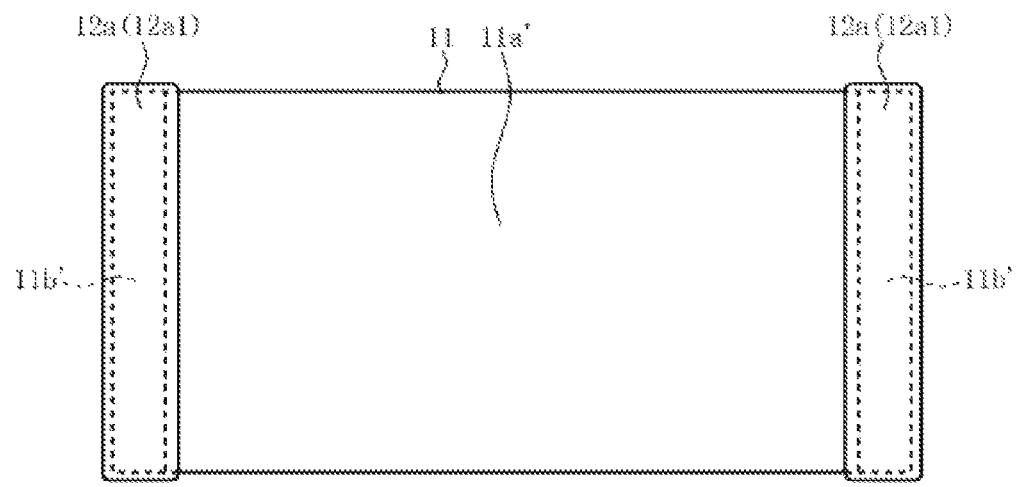
[Fig. 16]
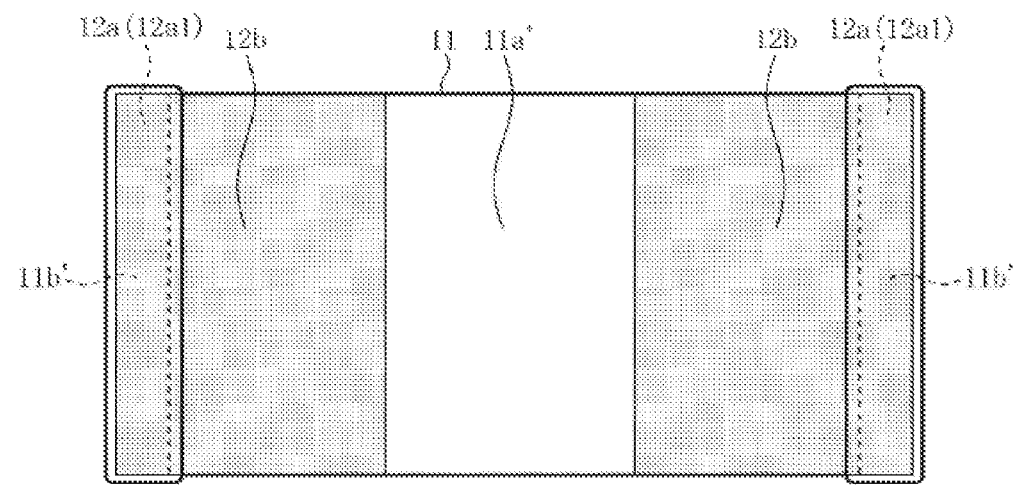
[Fig. 17A]
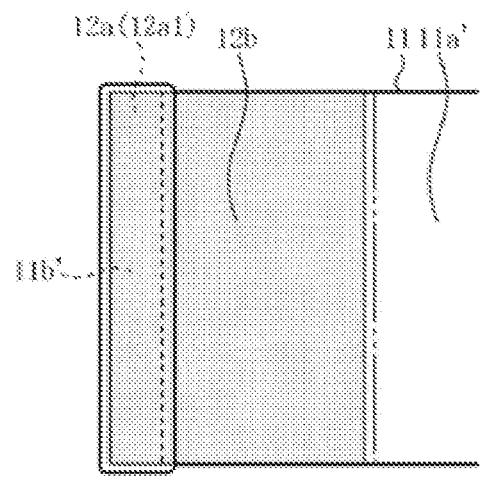
[Fig. 17B]
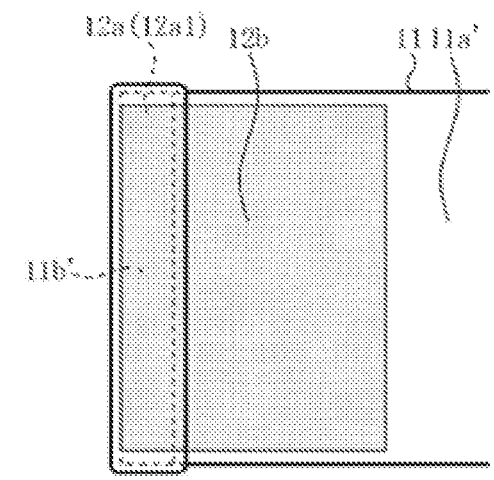

[Fig. 18]
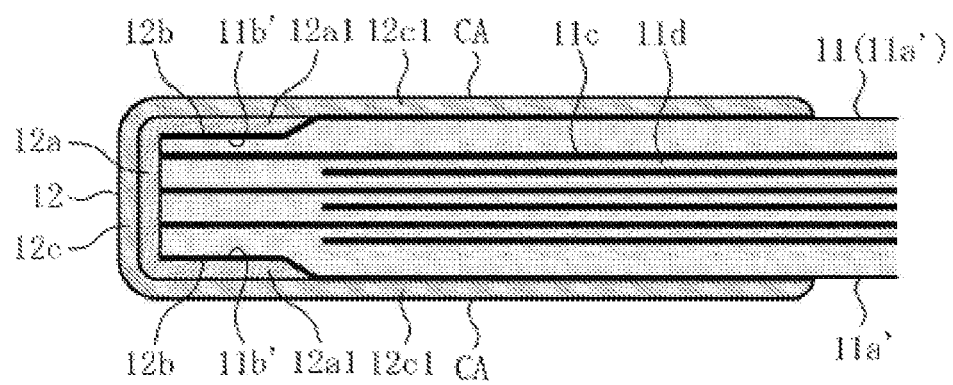
[Fig. 19]
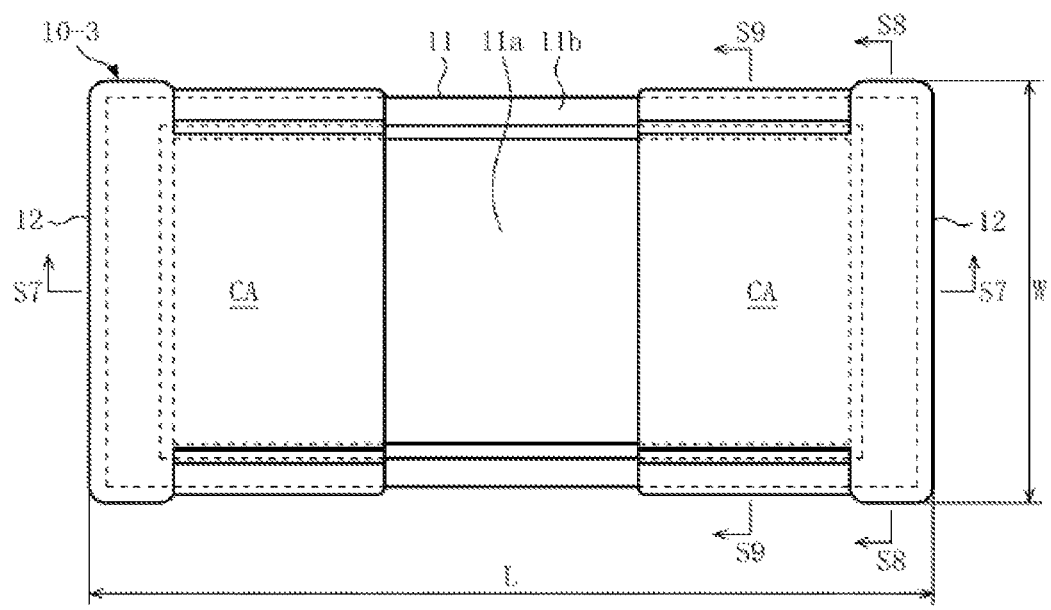

[Fig. 20A]
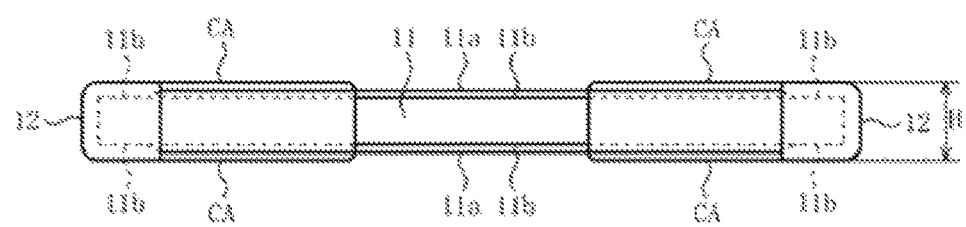
[Fig. 20B]
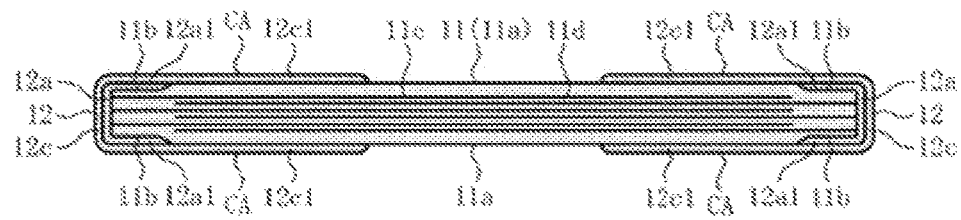
[Fig. 20C]
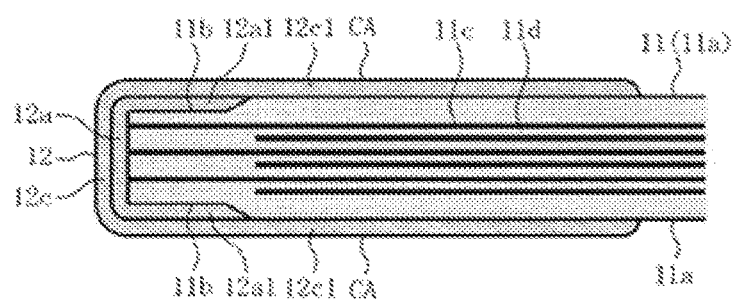

[Fig. 21A]
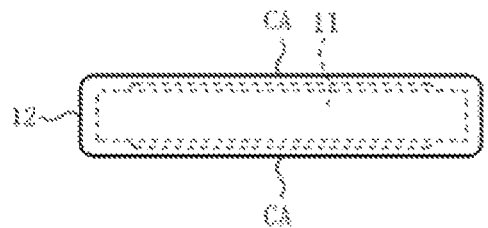
[Fig. 21B]
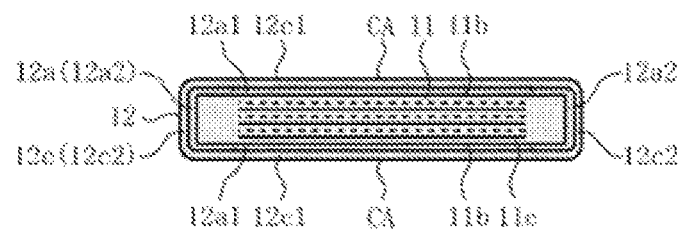
[Fig. 21C]
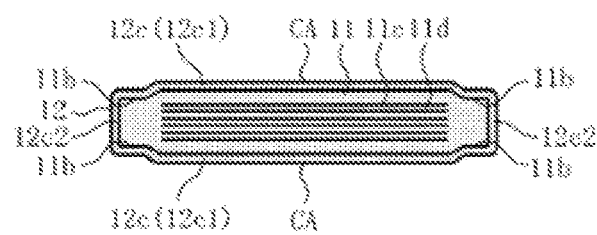
[Fig. 21D]
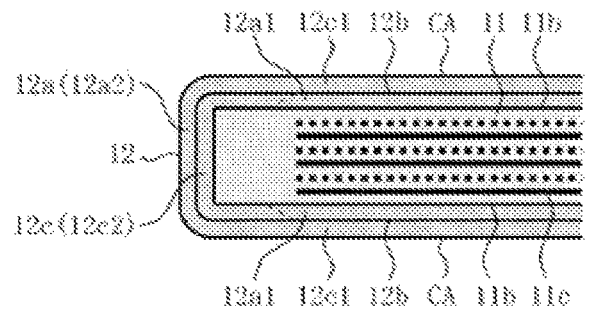
[Fig. 21E]
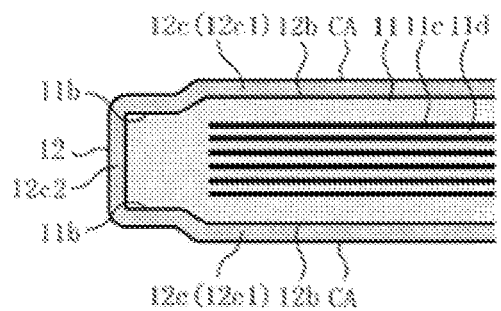

[Fig. 22]
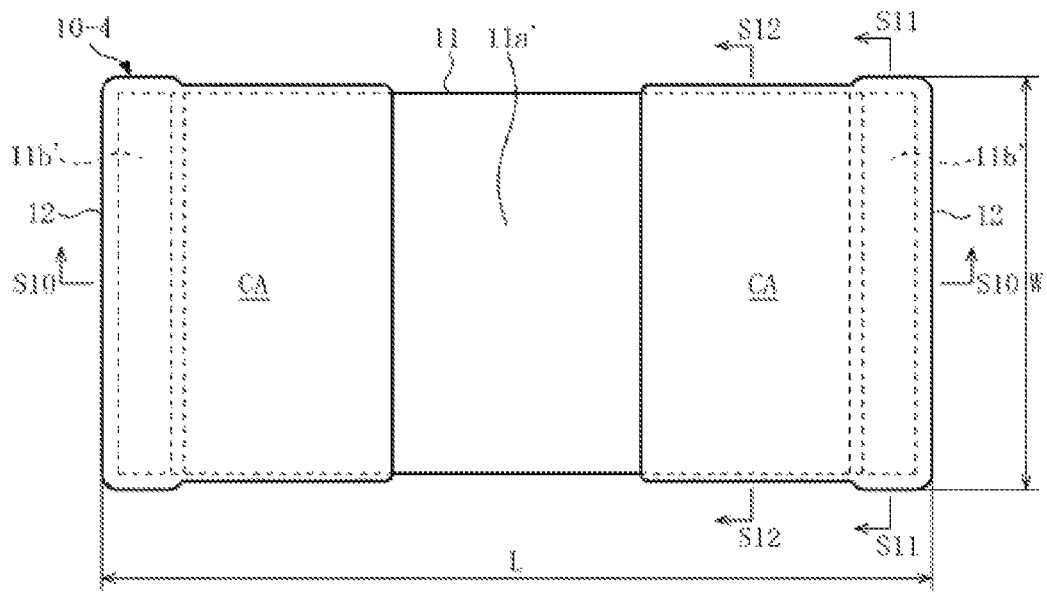
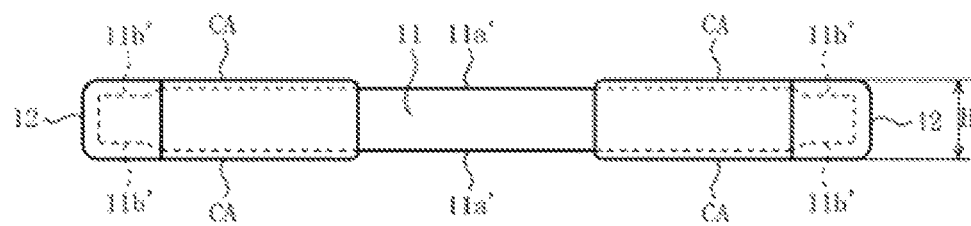
[Fig. 23A]
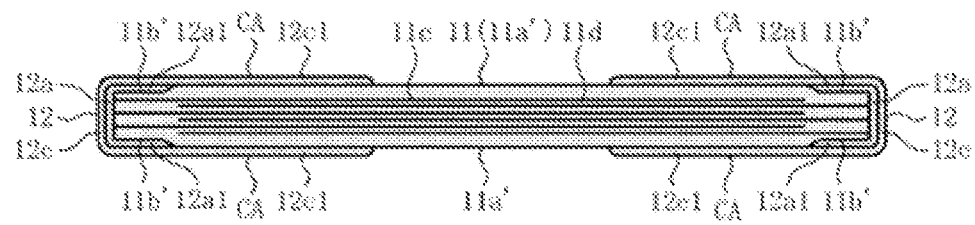
[Fig. 23B]
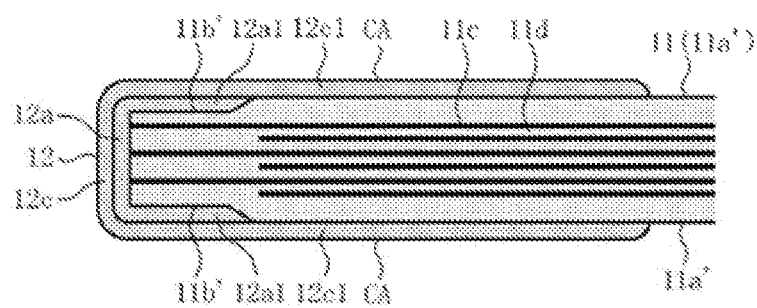
[Fig. 23C]

[Fig. 24A]
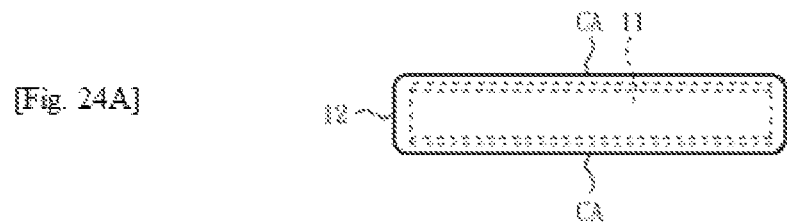
[Fig. 24B]
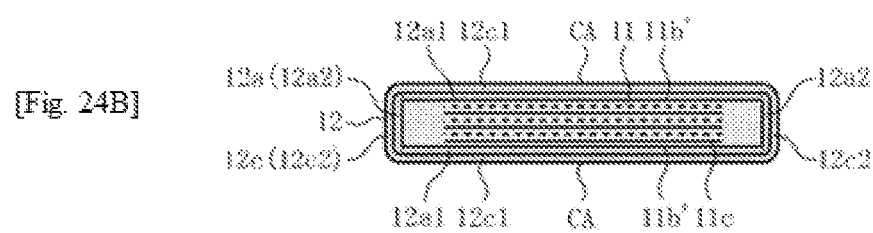
[Fig. 24C]
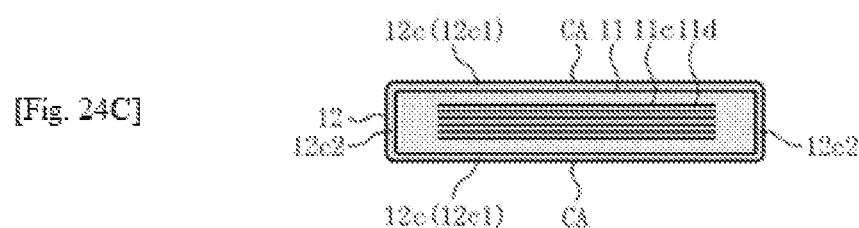
[Fig. 24D]
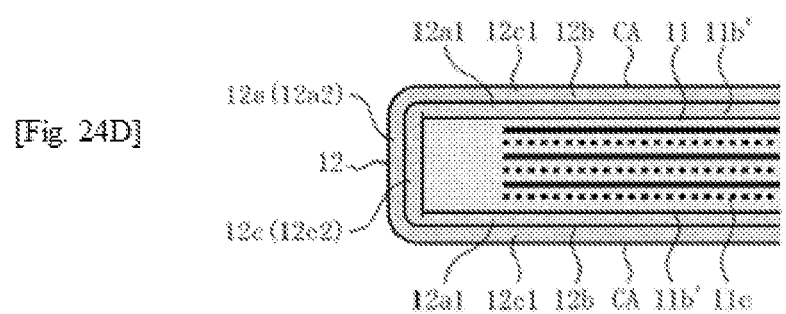
[Fig. 24E]
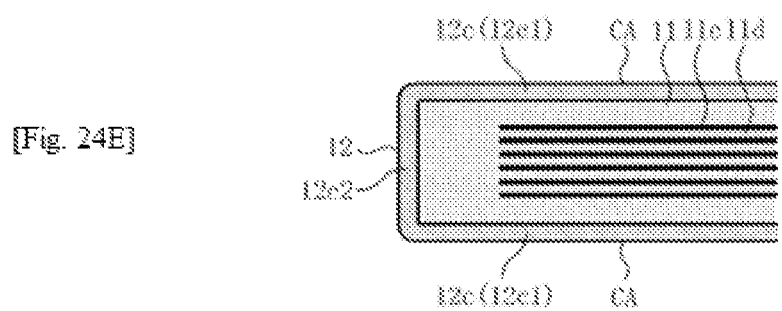

[Fig. 25]
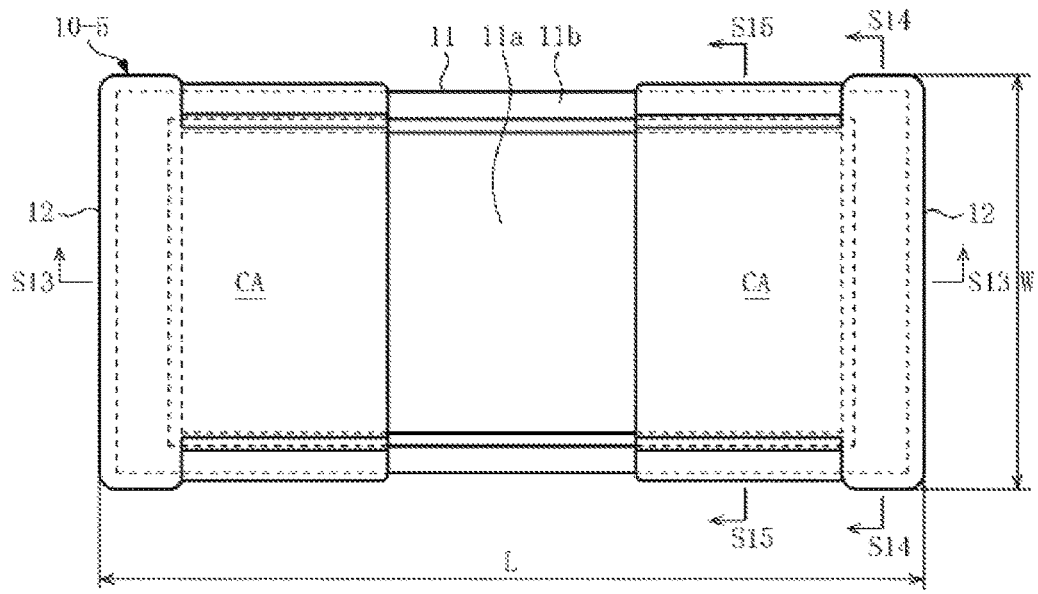
[Fig. 26A]
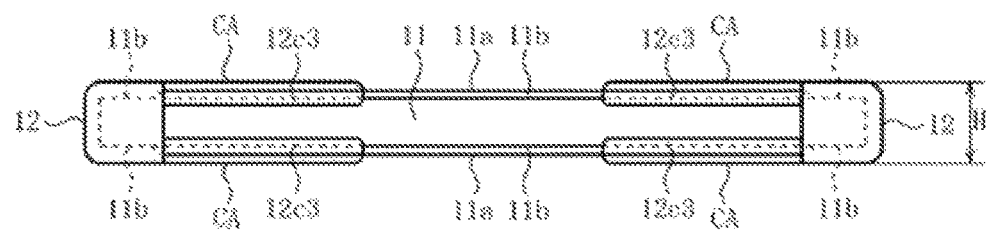
[Fig. 26B]
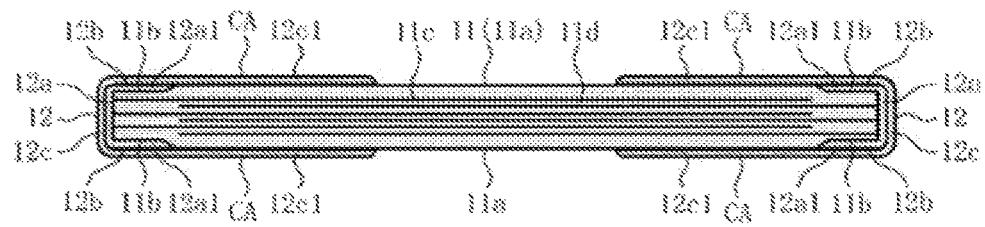
[Fig. 26C]
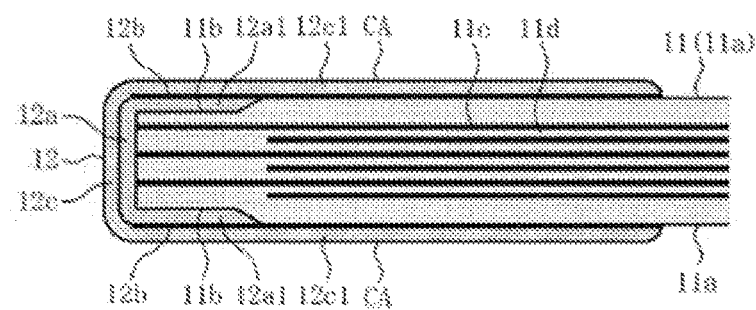

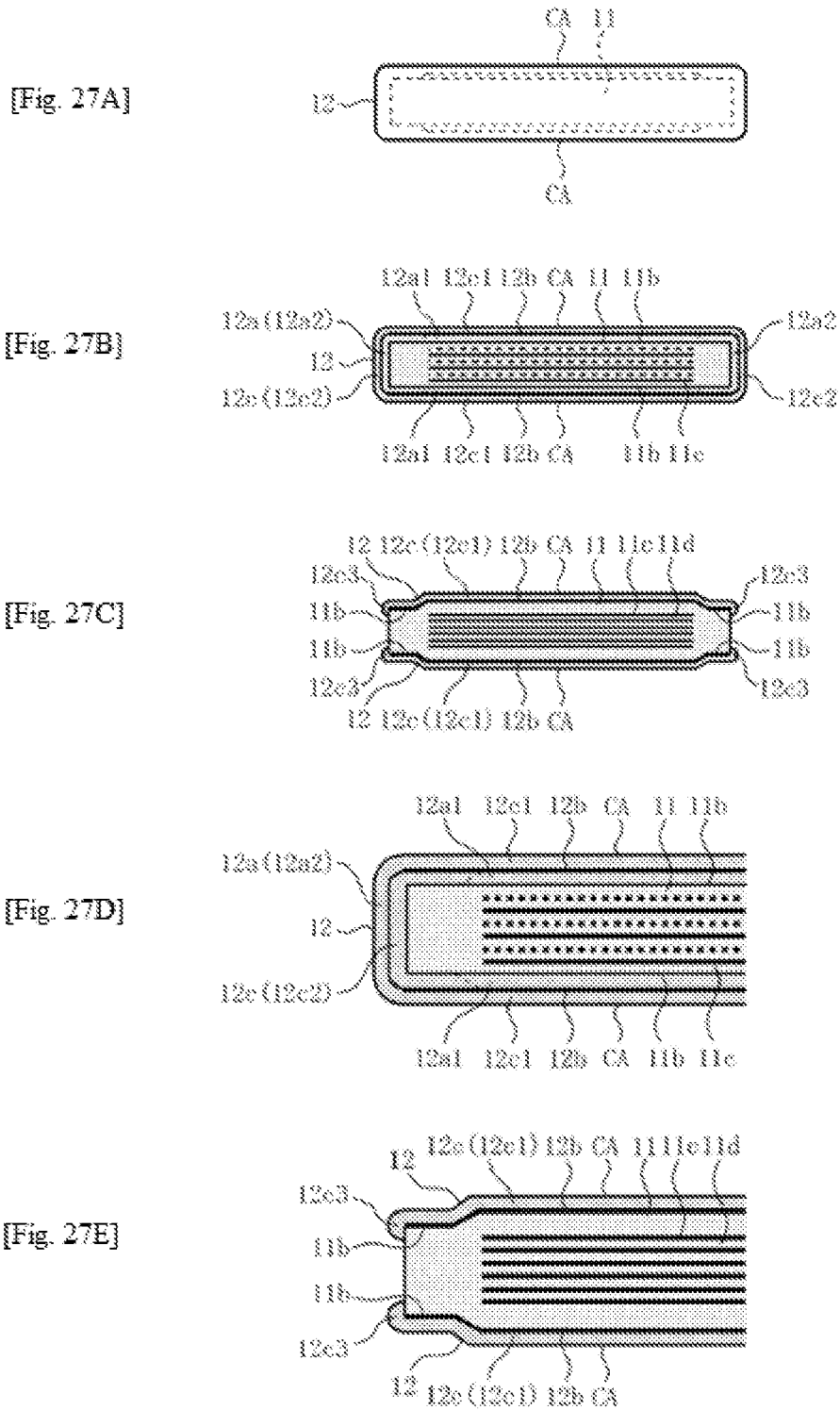

[Fig. 28]
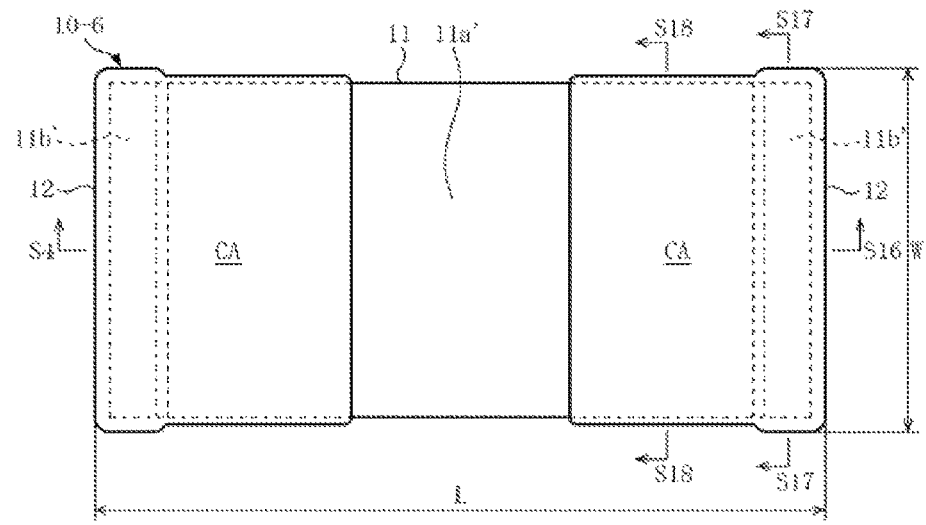
[Fig. 29A]
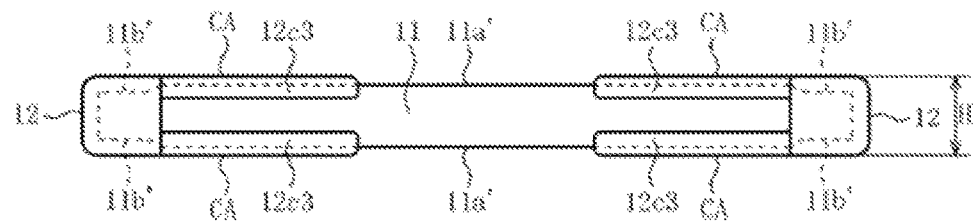
[Fig. 29B]
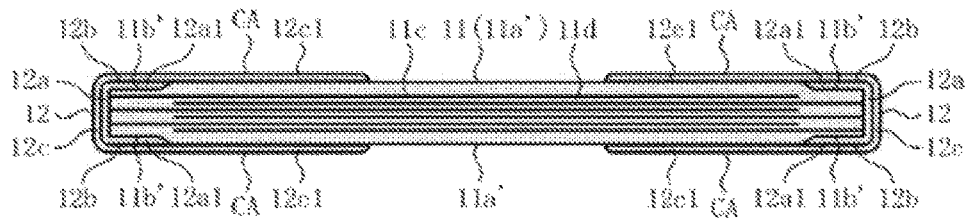
[Fig. 29C]
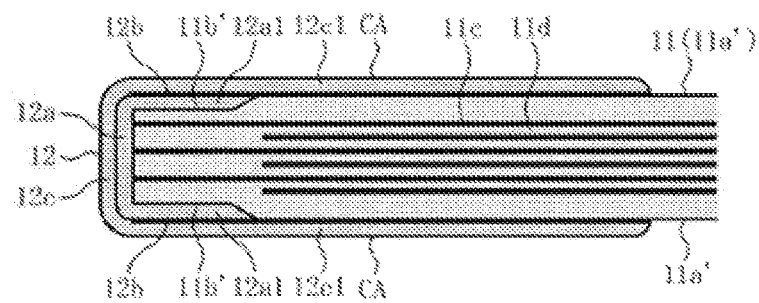

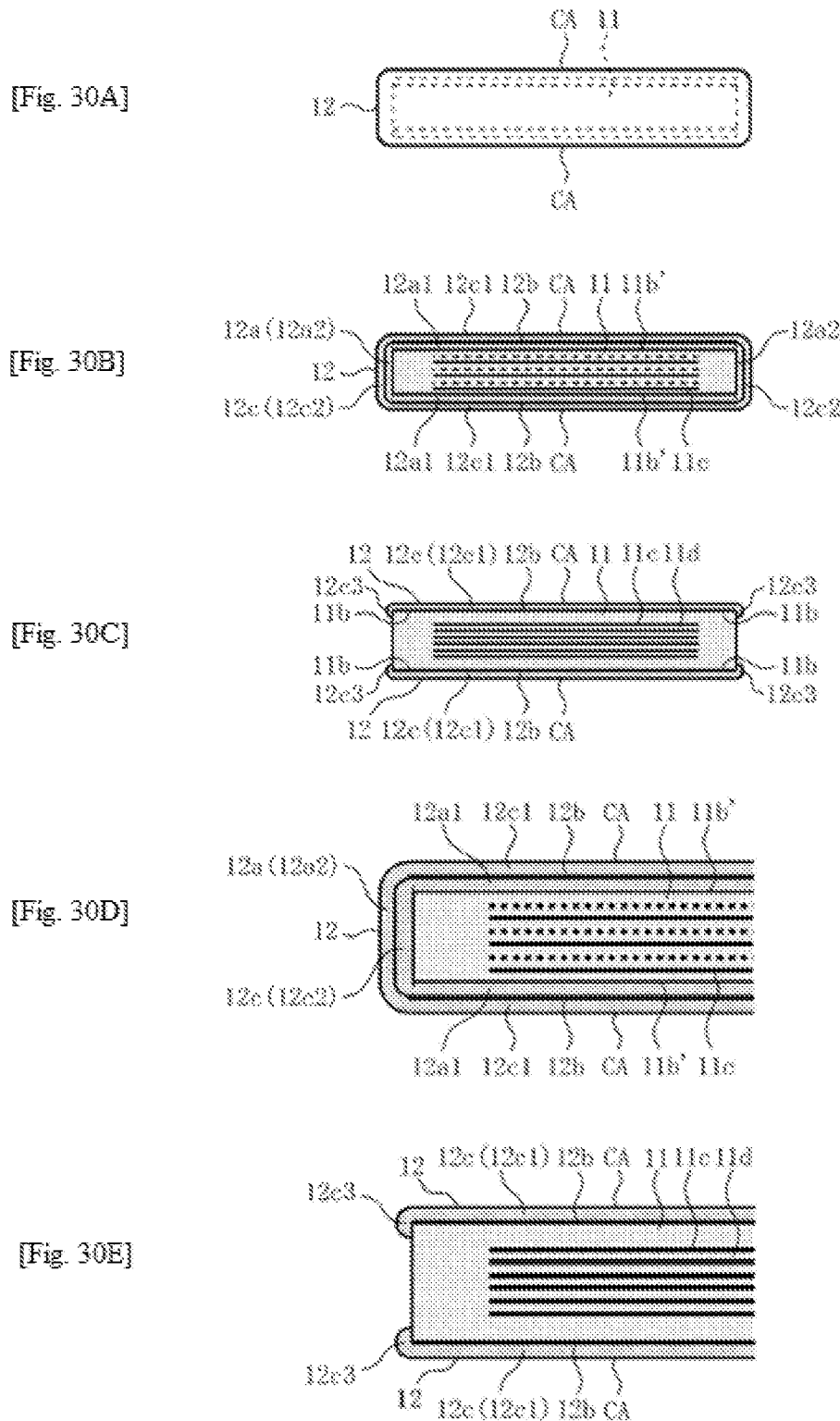

[Fig. 31A]
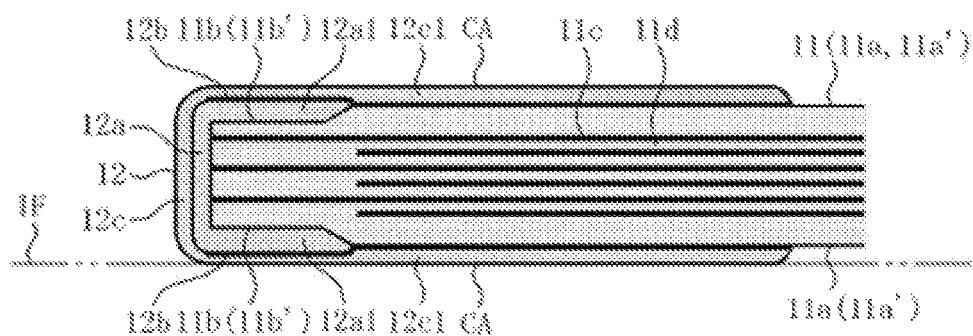
[Fig. 31B]
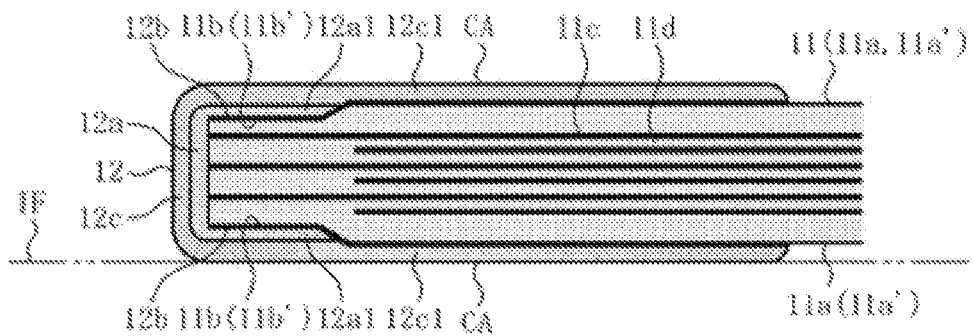

LAMINATED CERAMIC ELECTRONIC COMPONENT

BACKGROUND

Field of the Invention

The present invention relates to a laminated ceramic electronic component.

Description of the Related Art

Laminated ceramic electronic components such as laminated ceramic capacitors and laminated ceramic inductors are each generally constituted by a component body of laminate structure and external electrodes provided thereon. The component body has a shape of a roughly rectangular solid defined by the length, width, and height, and the external electrodes are provided on the component body in a manner electrically connecting to the internal electrode layers, coil layers, or other conductor parts inside the component body. These laminated ceramic electronic components are widely used in component mounting boards, boards with built-in components, etc., but given the current state where there is a persistent demand for smaller, thinner versions of these laminated ceramic electronic components, there are concerns regarding the connection reliability of external electrodes with respect to conductor pads and conductor vias.

Japanese Patent No. 5217584 discloses a structure of external electrodes 8a, 8b in light of the aforementioned connection reliability (refer to FIGS. 1 and 2 of the patent). These external electrodes 8a, 8b are such that their extended parts 9a, 9b are formed over the top surfaces of the leader parts 5a, 5b of the laminated ceramic element body 3 through the top surface of the function part 4, and the extended parts 9a, 9b on the top surfaces of the leader parts 5a, 5b are lower than the extended parts 9a, 9b over the function part 4; wrap-around parts 10a, 10b are formed over the end face of the laminated ceramic element body 3 through the surfaces of the extended parts 9a, 9b on the top surfaces of the leader parts 5a, 5b; and metal layers 12a, 12b are formed on the surfaces of these extended parts 9a, 9b and wrap-around parts 10a, 10b.

However, the structure of external electrodes 8a, 8b disclosed in Japanese Patent No. 5217584 allows marked height gaps and undulations to form on the top surfaces of the metal films 12a, 12b due to the forms of the extended parts 9a, 9b and wrap-around parts 10a, 10b that are present underneath them, which makes it difficult to improve the connection reliability with respect to conductor pads and conductor vias. If conductor pads are connected via solder to the top surfaces of the metal films 12a, 12b, for example, there are concerns that the aforementioned marked height gaps and undulations will change the clearances between the top surfaces of the metal films 12a, 12b and the conductor pads, thereby making it easy for the amounts of solder at locations of large clearances to deviate from the amounts of solder at locations of small clearances, leading to connection failures. If conductor vias are connected to the top surfaces of the metal films 12a, 12b, on the other hand, the aforementioned marked height gaps and undulations will reduce the areas that can be used for connection with the conductor vias, which may cause connection failures depending on the position tolerances of the conductor vias.

SUMMARY

An object of the present invention is to provide a laminated ceramic electronic component capable of substantially improving the connection reliability of its external electrodes with respect to conductor pads and conductor vias.

To achieve the aforementioned object, the present invention provides a laminated ceramic electronic component constituted by a component body of laminate structure and external electrodes provided thereon, wherein: the component body has a shape of roughly a rectangular solid defined by the length, width, and height, with a concaved part formed at and along the edges of one side and the other side in the height direction; the external electrodes each have a base conductor layer whose height-direction wrap-around part is formed inside the concaved part of the component body, and a main conductor layer whose height-direction wrap-around part is formed continuously over the height-direction wrap-around part of the base conductor layer through the planar part, except for the concaved part, of one side and the other side of the component body in the height direction; and the height-direction wrap-around part of the main conductor layer has a planar connecting area constituted by a surface area over the height-direction wrap-around part of the base conductor layer and a surface area over the planar part of the component body.

Any discussion of problems and solutions involved in the related art has been included in this disclosure solely for the purposes of providing a context for the present invention, and should not be taken as an admission that any or all of the discussion were known at the time the invention was made.

According to the present invention, a laminated ceramic electronic component capable of substantially improving the connection reliability of its external electrodes with respect to conductor pads and conductor vias can be provided.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

FIG. 1 is a view from a height direction of a laminated ceramic capacitor to which the present invention is applied (first embodiment).

FIG. 2A is a view from a width direction of the laminated ceramic capacitor shown in FIG. 1, FIG. 2B is a section view of FIG. 1 cut along line S1-S1, and FIG. 2C is an enlarged partial view of FIG. 2B.

FIG. 3A is a view from a length direction of the laminated ceramic capacitor shown in FIG. 1, FIG. 3B is a section view of FIG. 1 cut along line S2-S2, FIG. 3C is a section view of FIG. 1 cut along line S3-S3, FIG. 3D is an enlarged partial view of FIG. 3B, and FIG. 3E is an enlarged partial view of FIG. 3C.

FIG. 4 is a drawing explaining an example of manufacturing method of the laminated ceramic capacitor shown in FIG. 1.

FIG. 5A and FIG. 5B are drawings explaining an example of manufacturing method of the laminated ceramic capacitor shown in FIG. 1.

FIG. 6 is a drawing explaining an example of manufacturing method of the laminated ceramic capacitor shown in FIG. 1.

FIG. 7 is a drawing explaining an example of manufacturing method of the laminated ceramic capacitor shown in FIG. 1.

FIG. 8A and FIG. 8B are drawings explaining an example of manufacturing method of the laminated ceramic capacitor shown in FIG. 1.

FIG. 9 is an enlarged partial view showing a variation example of the laminated ceramic capacitor shown in FIG. 1.

FIG. 10 is a view from a height direction of a laminated ceramic capacitor to which the present invention is applied (second embodiment).

FIG. 11A is a view from a width direction of the laminated ceramic capacitor shown in FIG. 10, FIG. 11B is a section view of FIG. 10 cut along line S4-S4, and FIG. 11C is an enlarged partial view of FIG. 11B.

FIG. 12A is a view from a length direction of the laminated ceramic capacitor shown in FIG. 10, FIG. 12B is a section view of FIG. 10 cut along line S5-S5, FIG. 12C is a section view of FIG. 10 cut along line S6-S6, FIG. 12D is an enlarged partial view of FIG. 12B, and FIG. 12E is an enlarged partial view of FIG. 12C.

FIG. 13 is a drawing explaining an example of manufacturing method of the laminated ceramic capacitor shown in FIG. 10.

FIG. 14A and FIG. 14B are drawings explaining an example of manufacturing method of the laminated ceramic capacitor shown in FIG. 10.

FIG. 15 is a drawing explaining an example of manufacturing method of the laminated ceramic capacitor shown in FIG. 10.

FIG. 16 is a drawing explaining an example of manufacturing method of the laminated ceramic capacitor shown in FIG. 10.

FIG. 17A and FIG. 17B are drawings explaining an example of manufacturing method of the laminated ceramic capacitor shown in FIG. 10.

FIG. 18 is an enlarged partial view showing a variation example of the laminated ceramic capacitor shown in FIG. 10.

FIG. 19 is a view from a height direction of a laminated ceramic capacitor to which the present invention is applied (third embodiment).

FIG. 20A is a view from a width direction of the laminated ceramic capacitor shown in FIG. 19, FIG. 20B is a section view of FIG. 19 cut along line S7-S7, and FIG. 20C is an enlarged partial view of FIG. 20B.

FIG. 21A is a view from a length direction of the laminated ceramic capacitor shown in FIG. 19, FIG. 21B is a section view of FIG. 19 cut along line S8-S8, FIG. 21C is a section view of FIG. 19 cut along line S9-S9, FIG. 21D is an enlarged partial view of FIG. 21B, and FIG. 21E is an enlarged partial view of FIG. 21C.

FIG. 22 is a view from a height direction of a laminated ceramic capacitor to which the present invention is applied (fourth embodiment).

FIG. 23A is a view from a width direction of the laminated ceramic capacitor shown in FIG. 22, FIG. 23B is a section view of FIG. 22 cut along line S10-S10, and FIG. 23C is an enlarged partial view of FIG. 23B.

FIG. 24A is a view from a length direction of the laminated ceramic capacitor shown in FIG. 22, FIG. 24B is a section view of FIG. 22 cut along line S11-S11, FIG. 24C is a section view of FIG. 22 cut along line S12-S12, FIG. 24D is an enlarged partial view of FIG. 24B, and FIG. 24E is an enlarged partial view of FIG. 24C.

FIG. 25 is a view form a height direction of a laminated ceramic capacitor to which the present invention is applied (fifth embodiment).

FIG. 26A is a view from a width direction of the laminated ceramic capacitor shown in FIG. 25, FIG. 26B is a section view of FIG. 25 cut along line S13-S13, and FIG. 26C is an enlarged partial view of FIG. 26B.

FIG. 27A is a view from a length direction of the laminated ceramic capacitor shown in FIG. 25, FIG. 27B is a section view of FIG. 25 cut along line S14-S14, FIG. 27C is a section view of FIG. 25 cut along line S15-S15, FIG. 27D is an enlarged partial view of FIG. 27B, and FIG. 27E is an enlarged partial view of FIG. 27C.

FIG. 28 is a view from a height direction of a laminated ceramic capacitor to which the present invention is applied (sixth embodiment).

FIG. 29A is a view from a width direction of the laminated ceramic capacitor shown in FIG. 28, FIG. 29B is a section view of FIG. 28 cut along line S16-S16, and FIG. 29C is an enlarged partial view of FIG. 29B.

FIG. 30A is a view from a length direction of the laminated ceramic capacitor shown in FIG. 28, FIG. 30B is a section view of FIG. 28 cut along line S17-S17, FIG. 30C is a section view of FIG. 28 cut along line S18-S18, FIG. 30D is an enlarged partial view of FIG. 30B, and FIG. 30E is an enlarged partial view of FIG. 30C.

FIG. 31A and FIG. 31B are supplemental drawings explaining an example of manufacturing method for the first embodiment, second embodiment, fifth embodiment, and sixth embodiment.

DESCRIPTION OF THE SYMBOLS 10-1, 10-2, 10-3, 10-4, 10-5, 10-6—Laminated ceramic capacitor, 11—Capacitor body, 11a, 11a'—Planar part, 11b, 11b'—Concaved part, 11c—Internal electrode layer, 11d—Dielectric layer, 12—External electrode, 12a—Base conductor layer, 12a1—Height-direction wrap-around part of base conductor layer, 12a2—Width-direction wrap-around part of base conductor layer, 12b—Supplemental conductor layer, 12c—Main conductor layer, 12c1—Height-direction wrap-around part of main conductor layer, 12c2—Width-direction wrap-around part of main conductor layer, 12c3—Ridgeline covering part of main conductor layer, CA—Connecting area.

DETAILED DESCRIPTION OF EMBODIMENTS

First Embodiment (FIG. 1 to FIG. 9)

First, the structure of a laminated ceramic capacitor 10-1 to which the present invention is applied, is explained by citing FIG. 1 through FIG. 3. Incidentally, FIG. 1 shows both one side and the other side of the laminated ceramic capacitor 10-1 in the height direction, FIG. 2A shows both one side and the other side of the laminated ceramic capacitor 10-1 in the width direction, and FIG. 3A shows both one side and the other side of the laminated ceramic capacitor 10-1 in the length direction.

The length L, width W, and height H of the laminated ceramic capacitor 10-1 shown in FIG. 1 through FIG. 3 are 1000 μm, 500 μm, and 100 μm, respectively (all are reference dimensions not including tolerance). This laminated ceramic capacitor 10-1 has a capacitor body 11 of roughly a rectangular solid shape defined by the length, width, and height, as well as a total of two external electrodes 12 provided at both ends of the capacitor body 11 in the length direction.

The length, width, and height of the capacitor body 11 are 960 μm, 460 μm, and 80 μm, respectively (all are reference dimensions not including tolerance). This capacitor body 11 has a concaved part 11b (constituted by a recess having a sidewall 11b2 and a planar bottom 11b1) shaped like a rectangular frame, formed continuously at and along the length-direction edges and width-direction edges of one side and the other side in the height direction, and, except for the concaved part 11b, the areas of one side and the other side in the height direction constitute a roughly flat planar part 11a (also refer to FIG. 5). The length-direction dimension and width-direction dimension of the concaved part 11b are set in a range of 50 to 100 μm, while the depth of the concaved part 11b is set in a range of 5 to 10 μm. Incidentally, the locations where the concaved part 11b shaped like a rectangular frame becomes closer to the planar part 11a constitute a slanted surface or curved surface that gradually becomes shallower toward the planar part 11a.

Also, the capacitor body 11 has a capacitance part (no symbol) constituted by 6 to 60 rectangular-shaped internal electrode layers 11c (6 layers are shown in FIG. 2 and FIG. 3 for the purpose of convenience) stacked alternately with dielectric layers 11d, as well as protective parts (no symbol) positioned at both sides of the capacitance part in the height direction. The internal electrode layers 11c are staggered alternately in the length direction, where the length-direction edge of an odd-numbered internal electrode layer 11c from one side in the height direction is electrically connected to one external electrode 12, while the length-direction edge of an even-numbered internal electrode layer 11c is electrically connected to the other external electrode 12.

The length of the internal electrode layer 11c is equal to or less than the value of [Length of the capacitor body 11]−[Length-direction dimension of the concaved part 11b], and the width of the internal electrode layer 11c is equal to or less than the value of [Width of the capacitor body 11]−2×[Width-direction dimension of the concaved part 11b]. If the length-direction dimension of the concaved part 11b is 100 μm, for example, the length of the internal electrode layer 11c is set to 860 μm or less, and if the width-direction dimension of the concaved part 11b is 50 μm, the width of the internal electrode layer 11c is set to 360 μm or less. On the other hand, the length and width of the dielectric layer 11d and protective part are the same as the length and width of the capacitor body 11.

Also, the thickness of the internal electrode layer 11c is set in a range of 0.5 to 5 μm, thickness of the dielectric layer 11d is set in a range of 0.5 to 10 μm, and thickness of the protective part is set in a range of 10 to 20 μm. For example, if the thickness of the internal electrode layer 11c is 0.5 μm, thickness of the dielectric layer 11d is 0.5 μm, and thickness of the protective part is 10 μm, then the total number of internal electrode layers 11c becomes roughly 60.

The aforementioned internal electrode layer 11c preferably uses a good conductor whose primary component is nickel, copper, palladium, platinum, silver, gold, or alloy thereof, among others. On the other hand, the dielectric layer 11d and protective part use preferably dielectric ceramics whose primary component is barium titanate, strontium titanate, calcium titanate, magnesium titanate, calcium zirconate, calcium titanate zirconate, barium zirconate, titanium oxide, etc., or more preferably dielectric ceramics of ε>1000 or class 2 (high dielectric constant type).

Each external electrode 12 has a base conductor layer 12a, supplemental conductor layer 12b, and main conductor layer 12c. The base conductor layer 12a continuously has a part (no symbol) covering the end face of the capacitor body 11 in the length direction, height-direction wrap-around part 12a1 positioned on both sides of the capacitor body 11 in the height direction, and width-direction wrap-around part 12a2 positioned on both sides of the capacitor body 11 in the width direction. As shown in FIG. 2 and FIG. 3, the height-direction wrap-around part 12a1 is formed inside the part, along the length-direction edge, of the concaved part 11b present on one side and the other side of the capacitor body 11 in the height direction, while the width-direction wrap-around part 12a2 is formed at the ends of one side and the other side of the capacitor body 11 in the width direction. Also, the length of the height-direction wrap-around part 12a1 and that of the width-direction wrap-around part 12a2 are equivalent to the length-direction dimension of the concaved part 11b, while the thickness of the height-direction wrap-around part 12a1 and that of the width-direction wrap-around part 12a2, including the thickness of the part covering the end face of the capacitor body 11 in the length direction, are equivalent to the depth of the concaved part 11b.

Also, the supplemental conductor layer 12b is present between a height-direction wrap-around part 12c1 of the main conductor layer 12c and one side or the other side of the capacitor body 11 in the height direction. As shown in FIG. 2 and FIG. 3, the supplemental conductor layer 12b is formed continuously over the surface of the height-direction wrap-around part 12a1 of the base conductor layer 12a through one side and the other side of the capacitor body 11 in the height direction, or specifically to the surface of the planar part 11a and interior surface of the concaved part 11b along the width-direction edge (also refer to FIG. 7). This supplemental conductor layer 12b plays a role of supplementing the adhesion, to the capacitor body 11, of the height-direction wrap-around part 12c1 of the main conductor layer 12c, and its thickness is set in a range of 0.05 to 5 μm. The length of the supplemental conductor layer 12b is equivalent to the length of the height-direction wrap-around part 12c1 of the main conductor layer 12c or slightly shorter than this length, while the width of the supplemental conductor layer 12b is equivalent to the width of the capacitor body 11 or slightly narrower than this width.

Furthermore, the main conductor layer 12c continuously has a part (no symbol) covering the end face of the base conductor layer 12a in the length direction, height-direction wrap-around part 12c1 positioned on the surface of the supplemental conductor layer 12b, and width-direction wrap-around part 12c2 positioned on the surface of the width-direction wrap-around part 12a2 of the base conductor layer 12a. As shown in FIG. 2 and FIG. 3, the height-direction wrap-around part 12c1 is formed continuously over the surface of the supplemental conductor layer 12b, or in other words over the height-direction wrap-around part 12a1 of the base conductor layer 12a through the planar part 11a of the capacitor body 11 and part, along the width-direction edge, of the concaved part 11b, while the width-direction wrap-around part 12c2 is formed on the surface of the width-direction wrap-around part 12a2 of the base conductor layer 12a. In addition, the length of the height-direction wrap-around part 12c1 is set in a range of one-fifth to two-fifths of the length of the laminated ceramic capacitor 10-1, while the thickness of the height-direction wrap-around part 12c1 and that of the width-direction wrap-around part 12c2, including the part covering the end face of the base conductor layer 12a in the length direction, are set in a range of 3 to 10 μm. Incidentally, since the width-direction wrap-around part 12c2 is formed on the surface of the width-direction wrap-around part 12a2 of the base conductor layer 12a, the length of the width-direction wrap-around part 12c2 is shorter than the length of the height-direction wrap-around part 12c1, as shown in FIG. 2A.

In other words, the height-direction wrap-around part 12c1 of the main conductor layer 12c at each external electrode 12 has planar connecting areas CA that are roughly flat, constituted by a surface area over the height-direction wrap-around part 12a1 of the base conductor layer 12a and a surface area over the planar part 11a of the capacitor body 11.

The aforementioned base conductor layer 12a, supplemental conductor layer 12b, and main conductor layer 12c preferably use a good conductor whose primary component is nickel, copper, palladium, platinum, silver, gold, titanium, tin, zinc, or alloy thereof, among others. The primary components of the base conductor layer 12a, supplemental conductor layer 12b and main conductor layer 12c may be different or the same.

Next, a preferred example of manufacturing method of the laminated ceramic capacitor 10-1 shown in FIG. 1 through FIG. 3 is explained by citing FIG. 4 through FIG. 8.

If the primary component of the internal electrode layer 11c of the capacitor body 11 is nickel and the primary component of the dielectric layer 11d and protective part is barium titanate, then first a metal paste containing nickel powder, terpineol (solvent), ethyl cellulose (binder), and additives such as dispersant, as well as a ceramic slurry containing barium titanate powder, ethanol (solvent), polyvinyl butyral (binder), and additives such as dispersant, are prepared.

Then, using a die coater, gravure coater, or other coating machine and a drying machine, the ceramic slurry is coated onto the surface of a carrier film and then dried, to produce a first green sheet. Also, using a screen printer, gravure printer, or other printing machine and a drying machine, the metal paste is printed in matrix or zigzag patterns onto the surface of the first green sheet and then dried, to produce a second green sheet on which internal electrode layer patterns are formed (refer to FIG. 4). FIG. 4 shows a second green sheet GS corresponding to one laminated ceramic capacitor 10-1, where a U-shaped margin MA exists in a manner enclosing one edge in the length direction, and both edges in the width direction, of the rectangular internal electrode layer pattern CP.

Then, using a movable pickup head with stamping blade and heater or other laminating machine, individual sheets stamped from the first green sheet are stacked together until a specified number is reached, after which the stacked sheets are thermally bonded to produce a part corresponding to the protective part. Next, individual sheets stamped from the second green sheet (sheets that include internal electrode layer patterns) are stacked together until a specified number is reached, after which the stacked sheets are thermally bonded to produce a part corresponding to the capacitance part. Next, using a hot hydrostatic press or mechanical or hydraulic press or other final bonding machine, the stacked parts are finally bonded thermally to produce an unsintered laminated sheet.

Then, using a blade dicing machine, laser dicing machine, or other cutting machine, the unsintered laminated sheet is cut in a lattice pattern to produce unsintered chips, each corresponding to a capacitor body 11. Then, using a tunnel-type sintering furnace, box-type sintering furnace, or other sintering machine, the many unsintered chips are sintered (and the binder is removed) in a reducing ambience or ambience of low partial oxygen pressure, based on a temperature profile according to nickel and barium titanate, to produce a capacitor body 11.

FIG. 5A and FIG. 5B are views from a height direction and a width direction, respectively, of a capacitor body 11 produced through the sintering step. The produced capacitor body 11 has a concaved part 11b shaped like a rectangular frame, continuously formed along the length-direction edges and width-direction edges of one side and the other side in the height direction, and the areas of one side and the other side in the height direction, except for the concaved part 11b, constitute a roughly flat planar part 11a. This concaved part 11b is formed in the unsintered laminated-sheet production step, specifically by utilizing the fact that, compared to the area where the adjacent internal electrode layers 11c are facing each other in the height direction, in other areas the height dimension is more likely to decrease at the time of thermal bonding or final thermal bonding. Among the methods to form such concaved part 11b, the final thermal bonding method using a hot hydrostatic press, or final thermal bonding method using a mechanical or hydraulic press with an elastic plate made of synthetic rubber contacting both sides in the height direction, is favorably adopted.

Then, by using a roller coater, dip coater, or other coating machine and a drying machine, a metal paste (the aforementioned metal paste is carried over) is coated onto both ends of the capacitor body 11 in the length direction and then dried, after which the paste is baked in an ambience similar to the ones mentioned above, to produce a base conductor layer 12a (refer to FIG. 6). When producing a base conductor layer 12a, one part is formed on the end face of the capacitor body 11 in the length direction, height-direction wrap-around part 12a1 is formed inside the part, along the length-direction edge, of the concaved part 11b, and width-direction wrap-around part 12a2 is formed at the ends of one side and the other side of the capacitor body 11 in the width direction, while the thickness of the height-direction wrap-around part 12a1 is adjusted as close as possible to the depth of the concaved part 11b, as shown in FIG. 2 and FIG. 3. If the thickness of the height-direction wrap-around part 12a1 is markedly larger or smaller than the depth of the concaved part 11b, the viscosity of the metal paste used can be adjusted to adjust the thickness. If the thickness of the height-direction wrap-around part 12a1 is markedly larger than the depth of the concaved part 11b, the thickness can also be adjusted by scraping off any excess of the applied metal paste or by polishing off any excess part of the base conductor layer 12a that has been produced.

Then, a supplemental conductor layer 12b is produced in a manner continuing over the surface of the height-direction wrap-around part 12a1 of the base conductor layer 12a through the surface of the planar part 11a of the capacitor body 11 and interior surface of the part, along the width-direction edges, of the concaved part 11b (refer to FIG. 7). Among the methods to produce a thin supplemental conductor layer 12b, the method to spray a low-viscosity version of the aforementioned metal paste or other low-viscosity metal paste using a sprayer, etc., and then bake the metal paste in an ambience similar to the ones mentioned above, or method to form a thin nickel or non-nickel metal film using the sputtering method, vacuum deposition method, or other gas phase method, is favorably adopted. Also, if the thickness of the supplemental conductor layer 12b is several μm, a supplemental conductor layer 12b can be produced without problem according to the method to print the aforementioned metal paste or other metal paste using the screen printing method and then bake the metal paste in an ambience similar to the ones mentioned above. While FIG. 7 shows a supplemental conductor layer 12b whose length is equivalent to the length of the height-direction wrap-around part 12c1 of the main conductor layer 12c and whose width is equivalent to the width of the capacitor body 11 for the convenience of illustration, it is also permitted that, as mentioned above, the length of the supplemental conductor layer 12b is slightly shorter than the length of the height-direction wrap-around part 12c1 of the main conductor layer 12c (refer to FIG. 8A) and the width is slightly narrower than the width of the capacitor body 11 (refer to FIG. 8B).

Then, a main conductor layer 12c is produced in such a way that the part covering the end face of the base conductor layer 12a in the length direction, height-direction wrap-around part 12c1 positioned on the surface of the supplemental conductor layer 12b, and width-direction wrap-around part 12c2 positioned on the surface of the width-direction wrap-around part 12a2 of the base conductor layer 12a become continuous to each other. Among the methods to produce this main conductor layer 12c, the electroplating method, sputtering method, vacuum deposition method, or other gas phase method is favorably adopted.

Next, the effects obtained by the laminated ceramic capacitor 10-1 shown in FIG. 1 through FIG. 3 are explained (E11 through E13 below are symbols indicating effects).

(E11) The height-direction wrap-around part 12c1 of the main conductor layer 12c of each external electrode 12 has a planar connecting area CA constituted by a surface area over the height-direction wrap-around part 12a1 of the base conductor layer 12a and a surface area over the planar part 11a of the capacitor body 11, so this connecting area CA can be utilized to reliably connect conductor pads and conductor vias. When connecting the connecting area CA to a conductor pad via solder, for example, the clearance from the conductor pad remains roughly uniform because the connecting area CA is free from marked height gaps or undulations unlike before, and consequently connection failure due to uneven amounts of solder can be prevented. Also, when connecting the connecting area CA to a conductor via, a sufficient area to connect the conductor via can be ensured because the connecting area CA is free from marked height gaps or undulations unlike before, and consequently, connection failure due to position tolerance of the conductor via can be prevented.

(E12) The supplemental conductor layer 12b whose role is to supplement the adhesion of the height-direction wrap-around part 12c1 of the main conductor layer 12c to the capacitor body 11 is present between the height-direction wrap-around part 12c1 of the main conductor layer 12c of each external electrode 12 and one side or the other side of the capacitor body 11 in the height direction, so when utilizing the connecting area CA to connect a conductor pad or conductor via, or after the connection is completed, separation of the height-direction wrap-around part 12c1 of the main conductor layer 12c from the planar part 11a can be prevented. This supplemental conductor layer 12b is useful when the height-direction wrap-around part 12c1 of the main conductor layer 12c is directly formed on the capacitor body 11 and sufficient adhesive strength may not be obtained easily due to the surface roughness, material, or other aspect of the capacitor body 11.

(E13) The length of the width-direction wrap-around part 12c2 of the main conductor layer 12c of each external electrode 12 is shorter than the length of the height-direction wrap-around part 12c1 (refer to FIG. 1 and FIG. 2A), so areas that are not very relevant to the connection of the main conductor layer 12c to conductor pads and conductor vias can be eliminated to reduce the cost of materials for forming the main conductor layer 12c. Also, even when the laminated ceramic capacitor 10-1 deflects due to external force, etc., any stress applied to the height-direction wrap-around part 12c1 of the main conductor layer 12c of each external electrode 12 can be dispersed.

Variation Examples

Next, variation examples of the laminated ceramic capacitor 10-1 shown in FIG. 1 through FIG. 3 are explained (M11 and M12 below are symbols indicating variation examples).

(M11) With the laminated ceramic capacitor 10-1 shown in FIG. 1 through FIG. 3, the supplemental conductor layer 12b of each external electrode 12 was formed continuously over the surface of the height-direction wrap-around part 12a1 of the base conductor layer 12a through one side and the other side of the capacitor body 11 in the height direction, but as shown in FIG. 9, effects similar to those mentioned above can still be achieved by continuously forming the supplemental conductor layer 12b over the interior surface of the part, along the height-direction edges, of the concaved part 11b through one side and the other side of the capacitor body 11 in the height direction. To adopt a supplemental conductor layer 12b of this form, all that is necessary is to perform the step to produce a supplemental conductor layer 12b in the aforementioned example of manufacturing method between the step to produce an unsintered laminated sheet and the step to produce an unsintered chip, or between the step to produce an unsintered chip and the step to produce a base conductor layer.

(M12) With the laminated ceramic capacitor 10-1 shown in FIG. 1 through FIG. 3, part of the height-direction wrap-around part 12c1 of each external electrode 12 was not used as the connecting area CA; however, effects similar to those mentioned above can still be achieved by continuously forming the supplemental conductor layer 12b over the height-direction wrap-around part 12a1 of the base conductor layer 12a through the planar part 11a of the capacitor body 11, and shaping the height-direction wrap-around part 12c1 of the main conductor layer 12c to match the shape of the connecting area CA.

Second Embodiment (FIG. 10 Through FIG. 18)

First, the structure of a laminated ceramic capacitor 10-2 to which the present invention is applied, is explained by citing FIG. 10 through FIG. 12. Incidentally, FIG. 10 shows both one side and the other side of the laminated ceramic capacitor 10-2 in the height direction, FIG. 11A shows both one side and the other side of the laminated ceramic capacitor 10-2 in the width direction, and FIG. 12A shows both one side and the other side of the laminated ceramic capacitor 10-2 in the length direction.

The laminated ceramic capacitor 10-2 shown in FIG. 10 through FIG. 12 is structurally different from the aforementioned laminated ceramic capacitor 10-1 (first embodiment) in the following points:

A concaved part 11b' (constituted by a recess having a sidewall 11b'2 and a planar bottom 11b'1) is formed in a band shape only at and along the length-direction edges of one side and the other side of the capacitor body 11 in the height direction, and the areas of one side and the other side of the capacitor body 11 in the height direction, except for the concaved part 11b', provide a roughly flat planar part 11a' (refer to FIG. 10 through FIG. 12 and FIG. 14).

The supplemental conductor layer 12b is continuously formed over the surface of the height-direction wrap-around part 12a1 of the base conductor layer 12a through the surface of the planar part 11a' of one side and the other side of the capacitor body 11 in the height direction (refer to FIG. 10 through FIG. 12 and FIG. 16).

The height-direction wrap-around part 12c1 of the main conductor layer 12c is continuously formed over the surface of the supplemental conductor layer 12b, or in other words over the height-direction wrap-around part 12a1 of the base conductor layer 12a, through the planar part 11a of the capacitor body 11, and a roughly flat planar connecting area CA is constituted by a surface area over the height-direction wrap-around part 12a1 of the base conductor layer 12a and a surface area over the planar part 11a' (refer to FIG. 10 through FIG. 12).

The remainder of the structure is the same as with the aforementioned laminated ceramic capacitor 10-1 (first embodiment) and therefore not explained.

Next, a preferred example of manufacturing method of the laminated ceramic capacitor 10-2 shown in FIG. 10 through FIG. 12 is explained by citing FIG. 13 through FIG. 17.

If the primary component of the internal electrode layer 11c of the capacitor body 11 is nickel and the primary component of the dielectric layer 11d and protective part is barium titanate, then first a metal paste containing nickel powder, terpineol (solvent), ethyl cellulose (binder), and additives such as dispersant, as well as a ceramic slurry containing barium titanate powder, ethanol (solvent), polyvinyl butyral (binder), and additives such as dispersant, are prepared.

Then, using a die coater, gravure coater, or other coating machine and a drying machine, the ceramic slurry is coated onto the surface of a carrier film and then dried, to produce a first green sheet. Also, using a screen printer, gravure printer, or other printing machine and a drying machine, the metal paste is printed in matrix or zigzag patterns onto the surface of the first green sheet and then dried, while the ceramic slurry is coated onto the margins on both sides of each internal electrode layer pattern in the width direction and then dried, to produce a second green sheet on which internal electrode layer patterns are formed (refer to FIG. 13). FIG. 13 shows a second green sheet GS corresponding to one laminated ceramic capacitor 10-2, where a green sheet part GSa of equivalent thickness to the rectangular internal electrode layer pattern CP is formed on both sides of the pattern CP in the width direction, which means that a margin MA exists only along one length-direction edge of the second green sheet GS.

Then, using a movable pickup head with stamping blade and heater or other laminating machine, individual sheets stamped from the first green sheet are stacked together until a specified number is reached, after which the stacked sheets are thermally bonded to produce a part corresponding to the protective part. Next, individual sheets stamped from the second green sheet (sheets that include internal electrode layer patterns) are stacked together until a specified number is reached, after which the stacked sheets are thermally bonded to produce a part corresponding to the capacitance part. Next, using a hot hydrostatic press or mechanical or hydraulic press or other final bonding machine, the stacked parts are finally bonded thermally to produce an unsintered laminated sheet.

Then, using a blade dicing machine, laser dicing machine, or other cutting machine, the unsintered laminated sheet is cut in a lattice pattern to produce unsintered chips, each corresponding to a capacitor body 11. Then, using a tunnel-type sintering furnace, box-type sintering furnace, or other sintering machine, the many unsintered chips are sintered (and the binder is removed) in a reducing ambience or ambience of low partial oxygen pressure, based on a temperature profile according to nickel and barium titanate, to produce a capacitor body 11.

FIG. 14A and FIG. 14B are views from a height direction and a width direction, respectively, of a capacitor body 11 produced through the sintering step. The produced capacitor body 11 has a band-shaped concaved part 11b', formed only at and along the length-direction edges of one side and the other side in the height direction, and the areas of one side and the other side in the height direction, except for the concaved part 11b', constitute a roughly flat planar part 11a'. This concaved part 11b' is formed in the unsintered laminated-sheet production step, specifically by utilizing the fact that, compared to the area where the adjacent internal electrode layers 11c are facing each other in the height direction, in other areas the height dimension is more likely to decrease at the time of thermal bonding or final thermal bonding. Among the methods to form such concaved part 11b', the final thermal bonding method using a hot hydrostatic press, or final thermal bonding method using a mechanical or hydraulic press with an elastic plate made of synthetic rubber contacting both sides in the height direction, is favorably adopted.

Then, by using a roller coater, dip coater, or other coating machine and a drying machine, a metal paste (the aforementioned metal paste is carried over) is coated onto both ends of the capacitor body 11 in the length direction and then dried, after which the paste is baked in an ambience similar to the ones mentioned above, to produce a base conductor layer 12a (refer to FIG. 15). When producing a base conductor layer 12a, one part is formed on the end face of the capacitor body 11 in the length direction, height-direction wrap-around part 12a1 is formed inside the concaved part 11b', and width-direction wrap-around part 12a2 is formed at the ends of one side and the other side of the capacitor body 11 in the width direction, while the thickness of the height-direction wrap-around part 12a1 is adjusted as close as possible to the depth of the concaved part 11b', as shown in FIG. 11 and FIG. 12. If the thickness of the height-direction wrap-around part 12a1 is markedly larger or smaller than the depth of the concaved part 11b', the viscosity of the metal paste used can be adjusted to adjust the thickness. If the thickness of the height-direction wrap-around part 12a1 is markedly larger than the depth of the concaved part 11b', the thickness can also be adjusted by scraping off any excess of the applied metal paste or by polishing off any excess part of the base conductor layer 12a that has been produced.

Then, a supplemental conductor layer 12b is produced in a manner continuing over the surface of the height-direction wrap-around part 12a1 of the base conductor layer 12a through the surface of the planar part 11a' of the capacitor body 11 (refer to FIG. 16). Among the methods to produce a thin supplemental conductor layer 12b, the method to spray a low-viscosity version of the aforementioned metal paste or other low-viscosity metal paste using a sprayer, etc., and then bake the metal paste in an ambience similar to the ones mentioned above, or method to form a thin nickel or non-nickel metal film using the sputtering method, vacuum deposition method, or other gas phase method, is favorably adopted. Also, if the thickness of the supplemental conductor layer 12b is several μm, a supplemental conductor layer 12b can be produced without problem according to the method to print the aforementioned metal paste or other metal paste using the screen printing method and then bake the metal paste in an ambience similar to the ones mentioned above. While FIG. 16 shows a supplemental conductor layer 12b whose length is equivalent to the length of the height-direction wrap-around part 12c1 of the main conductor layer 12c and whose width is equivalent to the width of the capacitor body 11 for the convenience of illustration, it is also permitted that, as mentioned above, the length of the supplemental conductor layer 12b is slightly shorter than the length of the height-direction wrap-around part 12c1 of the main conductor layer 12c (refer to FIG. 17A) and the width is slightly narrower than the width of the capacitor body 11 (refer to FIG. 17B).

Then, a main conductor layer 12c is produced in such a way that the part covering the end face of the base conductor layer 12a in the length direction, height-direction wrap-around part 12c1 positioned on the surface of the supplemental conductor layer 12b, and width-direction wrap-around part 12c2 positioned on the surface of the width-direction wrap-around part 12a2 of the base conductor layer 12a become continuous to each other. Among the methods to produce this main conductor layer 12c, the electroplating method, sputtering method, vacuum deposition method, or other gas phase method is favorably adopted.

Next, the effects obtained by the laminated ceramic capacitor 10-2 shown in FIG. 10 through FIG. 12 are explained (E21 through E23 below are symbols indicating effects).

(E21) The height-direction wrap-around part 12c1 of the main conductor layer 12c of each external electrode 12 has a planar connecting area CA constituted by a surface area over the height-direction wrap-around part 12a1 of the base conductor layer 12a and a surface area over the planar part 11a' of the capacitor body 11, so this connecting area CA can be utilized to reliably connect conductor pads and conductor vias. When connecting the connecting area CA to a conductor pad via solder, for example, the clearance from the conductor pad remains roughly uniform because the connecting area CA is free from marked height gaps or undulations unlike before, and consequently connection failure due to uneven amounts of solder can be prevented. Also, when connecting the connecting area CA to a conductor via, a sufficient area to connect the conductor via can be ensured because the connecting area CA is free from marked height gaps or undulations unlike before, and consequently connection failure due to position tolerance of the conductor via can be prevented.

(E22) The supplemental conductor layer 12b whose role is to supplement the adhesion of the height-direction wrap-around part 12c1 of the main conductor layer 12c to the capacitor body 11 is present between the height-direction wrap-around part 12c1 of the main conductor layer 12c of each external electrode 12 and one side or the other side of the capacitor body 11 in the height direction, so when utilizing the connecting area CA to connect a conductor pad or conductor via, or after the connection is completed, separation of the height-direction wrap-around part 12c1 of the main conductor layer 12c from the planar part 11a can be prevented. This supplemental conductor layer 12b is useful when the height-direction wrap-around part 12c1 of the main conductor layer 12c is directly formed on the capacitor body 11 and sufficient adhesive strength may not be obtained easily due to the surface roughness, material, or other aspect of the capacitor body 11.

(E23) The length of the width-direction wrap-around part 12c2 of the main conductor layer 12c of each external electrode 12 is shorter than the length of the height-direction wrap-around part 12c1 (refer to FIG. 10 and FIG. 11A), so areas that are not very relevant to the connection of the main conductor layer 12c to conductor pads and conductor vias can be eliminated to reduce the cost of materials for forming the main conductor layer 12c. Also, even when the laminated ceramic capacitor 10-2 deflects due to external force, etc., any stress applied to the height-direction wrap-around part 12c1 of the main conductor layer 12c of each external electrode 12 can be dispersed.

Variation Examples

Next, a variation example of the laminated ceramic capacitor 10-2 shown in FIG. 10 through FIG. 12 is explained (M21 below is a symbol indicating a variation example).

(M21) With the laminated ceramic capacitor 10-2 shown in FIG. 10 through FIG. 12, the supplemental conductor layer 12b of each external electrode 12 was formed continuously over the surface of the height-direction wrap-around part 12a1 of the base conductor layer 12a through one side and the other side of the capacitor body 11 in the height direction, but as shown in FIG. 18, effects similar to those mentioned above can still be achieved by continuously forming the supplemental conductor layer 12b over the interior surface of the concaved part 11b' through one side and the other side of the capacitor body 11 in the height direction. To adopt a supplemental conductor layer 12b of this form, all that is necessary is to perform the step to produce a supplemental conductor layer 12b in the aforementioned example of manufacturing method between the step to produce an unsintered laminated sheet and the step to produce an unsintered chip, or between the step to produce an unsintered chip and the step to produce a base conductor layer.

Third Embodiment (FIG. 19 Through FIG. 21)

First, the structure of a laminated ceramic capacitor 10-3 to which the present invention is applied, is explained by citing FIG. 19 through FIG. 21. Incidentally, FIG. 19 shows both one side and the other side of the laminated ceramic capacitor 10-3 in the height direction, FIG. 20A shows both one side and the other side of the laminated ceramic capacitor 10-3 in the width direction, and FIG. 21A shows both one side and the other side of the laminated ceramic capacitor 10-3 in the length direction.

The laminated ceramic capacitor 10-3 shown in FIG. 19 through FIG. 21 is structurally different from the aforementioned laminated ceramic capacitor 10-1 (first embodiment) in the following points:

The supplemental conductor layer 12b has been eliminated (refer to FIG. 19 through FIG. 21).

The height-direction wrap-around part 12c1 of the main conductor layer 12c is continuously formed over the surface of the height-direction wrap-around part 12a1 of the base conductor layer 12a through the surface of the planar part 11a of the capacitor body 11 and interior surface of the part, along the width-direction edges, of the concaved part 11b, while the width-direction wrap-around part 12c2 is continuously formed over the surface of the width-direction wrap-around part 12a2 of the base conductor layer 12a through one side and the other side of the capacitor body 11 in the width direction (refer to FIG. 19 through FIG. 21).

The length of the width-direction wrap-around part 12c2 of the main conductor layer 12c is equivalent to the length of the height-direction wrap-around part 12c1 (refer to FIG. 19 and (A) in FIG. 20).

The remainder of the structure is the same as with the aforementioned laminated ceramic capacitor 10-1 (first embodiment) and therefore not explained.

Next, a preferred example of manufacturing method of the laminated ceramic capacitor 10-3 shown in FIG. 19 through FIG. 21 is explained by citing FIG. 4 through FIG. 6.

If the primary component of the internal electrode layer 11c of the capacitor body 11 is nickel and the primary component of the dielectric layer 11d and protective part is barium titanate, then first a metal paste containing nickel powder, terpineol (solvent), ethyl cellulose (binder), and additives such as dispersant, as well as a ceramic slurry containing barium titanate powder, ethanol (solvent), polyvinyl butyral (binder), and additives such as dispersant, are prepared.

Then, using a die coater, gravure coater, or other coating machine and a drying machine, the ceramic slurry is coated onto the surface of a carrier film and then dried, to produce a first green sheet. Also, using a screen printer, gravure printer, or other printing machine and a drying machine, the metal paste is printed in matrix or zigzag patterns onto the surface of the first green sheet and then dried, to produce a second green sheet on which internal electrode layer patterns are formed (refer to FIG. 4). FIG. 4 shows a second green sheet GS corresponding to one laminated ceramic capacitor 10-3, where a U-shaped margin MA exists in a manner enclosing one edge in the length direction, and both edges in the width direction, of the rectangular internal electrode layer pattern CP.

Then, using a movable pickup head with stamping blade and heater or other laminating machine, individual sheets stamped from the first green sheet are stacked together until a specified number is reached, after which the stacked sheets are thermally bonded to produce a part corresponding to the protective part. Next, individual sheets stamped from the second green sheet (sheets that include internal electrode layer patterns) are stacked together until a specified number is reached, after which the stacked sheets are thermally bonded to produce a part corresponding to the capacitance part. Next, using a hot hydrostatic press or mechanical or hydraulic press or other final bonding machine, the stacked parts are finally bonded thermally to produce an unsintered laminated sheet.

Then, using a blade dicing machine, laser dicing machine, or other cutting machine, the unsintered laminated sheet is cut in a lattice pattern to produce unsintered chips, each corresponding to a capacitor body 11. Then, using a tunnel-type sintering furnace, box-type sintering furnace, or other sintering machine, the many unsintered chips are sintered (and the binder is removed) in a reducing ambience or ambience of low partial oxygen pressure, based on a temperature profile according to nickel and barium titanate, to produce a capacitor body 11.

The produced capacitor body 11 has a concaved part 11b shaped like a rectangular frame, continuously formed along the length-direction edges and width-direction edges of one side and the other side in the height direction, and the areas of one side and the other side in the height direction, except for the concaved part 11b, constitute a roughly flat planar part 11a (refer to FIG. 5). This concaved part 11b is formed in the unsintered laminated-sheet production step, specifically by utilizing the fact that, compared to the area where the adjacent internal electrode layers 11c are facing each other in the height direction, in other areas the height dimension is more likely to decrease at the time of thermal bonding or final thermal bonding. Among the methods to form such concaved part 11b, the final thermal bonding method using a hot hydrostatic press, or final thermal bonding method using a mechanical or hydraulic press with an elastic plate made of synthetic rubber contacting both sides in the height direction, is favorably adopted.

Then, by using a roller coater, dip coater, or other coating machine and a drying machine, a metal paste (the aforementioned metal paste is carried over) is coated onto both ends of the capacitor body 11 in the length direction and then dried, after which the paste is baked in an ambience similar to the ones mentioned above, to produce a base conductor layer 12a (refer to FIG. 6). When producing a base conductor layer 12a, one part is formed on the end face of the capacitor body 11 in the length direction, height-direction wrap-around part 12a1 is formed inside the part, along the length-direction edges, of the concaved part 11b, and width-direction wrap-around part 12a2 is formed at the ends of one side and the other side of the capacitor body 11 in the width direction, while the thickness of the height-direction wrap-around part 12a1 is adjusted as close as possible to the depth of the concaved part 11b, as shown in FIG. 20 and FIG. 21. If the thickness of the height-direction wrap-around part 12a1 is markedly larger or smaller than the depth of the concaved part 11b, the viscosity of the metal paste used can be adjusted to adjust the thickness. If the thickness of the height-direction wrap-around part 12a1 is markedly larger than the depth of the concaved part 11b, the thickness can also be adjusted by scraping off any excess of the applied metal paste or by polishing off any excess part of the base conductor layer 12a that has been produced.

Then, a main conductor layer 12c is produced in such a way that the part covering the end face of the base conductor layer 12a in the length direction, surface of the height-direction wrap-around part 12a1 of the base conductor layer 12a and height-direction wrap-around part 12c1 positioned on one side and the other side of the capacitor body 11 in the height direction, and surface of the width-direction wrap-around part 12a2 of the base conductor layer 12a and width-direction wrap-around part 12c2 positioned on one side and the other side of the capacitor body 11 in the width direction, become continuous to each other. Among the methods to produce such main conductor layer 12c, the sputtering method, vacuum deposition method, or other gas phase method is favorably adopted.

Next, the effects obtained by the laminated ceramic capacitor 10-3 shown in FIG. 19 through FIG. 21 are explained (E31 and E32 below are symbols indicating effects).

(E31) The height-direction wrap-around part 12c1 of the main conductor layer 12c of each external electrode 12 has a planar connecting area CA constituted by a surface area over the height-direction wrap-around part 12a1 of the base conductor layer 12a and a surface area over the planar part 11a of the capacitor body 11, so this connecting area CA can be utilized to reliably connect conductor pads and conductor vias. When connecting the connecting area CA to a conductor pad via solder, for example, the clearance from the conductor pad remains roughly uniform because the connecting area CA is free from marked height gaps or undulations unlike before, and consequently connection failure due to uneven amounts of solder can be prevented. Also, when connecting the connecting area CA to a conductor via, a sufficient area to connect the conductor via can be ensured because the connecting area CA is free from marked height gaps or undulations unlike before, and consequently connection failure due to position tolerance of the conductor via can be prevented.

(E32) The length of the width-direction wrap-around part 12c2 of the main conductor layer 12c of each external electrode 12 is equivalent to the length of the height-direction wrap-around part 12c1 (refer to FIG. 19 and FIG. 20A), which ensures a form in which around 40 to 80% of the entire surface of the capacitor body 11 is covered by the very flexible main conductor layer 12c and this improves the breaking strength of the laminated ceramic capacitor 10-3.

Fourth Embodiment (FIG. 22 Through FIG. 24)

First, the structure of a laminated ceramic capacitor 10-4 to which the present invention is applied, is explained by citing FIG. 22 through FIG. 24. Incidentally, FIG. 22 shows both one side and the other side of the laminated ceramic capacitor 10-4 in the height direction, FIG. 23A shows both one side and the other side of the laminated ceramic capacitor 10-4 in the width direction, and FIG. 24A shows both one side and the other side of the laminated ceramic capacitor 10-4 in the length direction.

The laminated ceramic capacitor 10-4 shown in FIG. 22 through FIG. 24 is structurally different from the aforementioned laminated ceramic capacitor 10-1 (first embodiment) in the following points:

A concaved part 11b' is formed in a band shape only at and along the length-direction edges of one side and the other side of the capacitor body 11 in the height direction, and the areas of one side and the other side of the capacitor body 11 in the height direction, except for the concaved part 11b', provide a roughly flat planar part 11a' (refer to FIG. 22 through FIG. 24).

The supplemental conductor layer 12b has been eliminated (refer to FIG. 22 through FIG. 24).

The height-direction wrap-around part 12c1 of the main conductor layer 12c is continuously formed over the surface of the height-direction wrap-around part 12a1 of the base conductor layer 12a through the surface of the planar part 11a' of the capacitor body 11, while the width-direction wrap-around part 12c2 is continuously formed over the surface of the width-direction wrap-around part 12a2 of the base conductor layer 12a through one side and the other side of the capacitor body 11 in the width direction (refer to FIG. 22 through FIG. 24).

The length of the width-direction wrap-around part 12c2 of the main conductor layer 12c is equivalent to the length of the height-direction wrap-around part 12c1 (refer to FIG. 22 and FIG. 23A.

The remainder of the structure is the same as with the aforementioned laminated ceramic capacitor 10-1 (first embodiment) and therefore not explained.

Next, a preferred example of manufacturing method of the laminated ceramic capacitor 10-4 shown in FIG. 22 through FIG. 24 is explained by citing FIG. 13 through FIG. 15.

If the primary component of the internal electrode layer 11c of the capacitor body 11 is nickel and the primary component of the dielectric layer 11d and protective part is barium titanate, then first a metal paste containing nickel powder, terpineol (solvent), ethyl cellulose (binder), and additives such as dispersant, as well as a ceramic slurry containing barium titanate powder, ethanol (solvent), polyvinyl butyral (binder), and additives such as dispersant, are prepared.

Then, using a die coater, gravure coater, or other coating machine and a drying machine, the ceramic slurry is coated onto the surface of a carrier film and then dried, to produce a first green sheet. Also, using a screen printer, gravure printer, or other printing machine and a drying machine, the metal paste is printed in matrix or zigzag patterns onto the surface of the first green sheet and then dried, while the ceramic slurry is coated onto the margins on both sides of each internal electrode layer pattern in the width direction and then dried, to produce a second green sheet on which internal electrode layer patterns are formed (refer to FIG. 13). FIG. 13 shows a second green sheet GS corresponding to one laminated ceramic capacitor 10-4, where a green sheet part GSa of equivalent thickness to the rectangular internal electrode layer pattern CP is formed on both sides of the pattern CP in the width direction, which means that a margin MA exists only along one length-direction edge of the second green sheet GS.

Then, using a movable pickup head with stamping blade and heater or other laminating machine, individual sheets stamped from the first green sheet are stacked together until a specified number is reached, after which the stacked sheets are thermally bonded to produce a part corresponding to the protective part. Next, individual sheets stamped from the second green sheet (sheets that include internal electrode layer patterns) are stacked together until a specified number is reached, after which the stacked sheets are thermally bonded to produce a part corresponding to the capacitance part. Next, using a hot hydrostatic press or mechanical or hydraulic press or other final bonding machine, the stacked parts are finally bonded thermally to produce an unsintered laminated sheet.

Then, using a blade dicing machine, laser dicing machine, or other cutting machine, the unsintered laminated sheet is cut in a lattice pattern to produce unsintered chips, each corresponding to a capacitor body 11. Then, using a tunnel-type sintering furnace, box-type sintering furnace, or other sintering machine, the many unsintered chips are sintered (and the binder is removed) in a reducing ambience or ambience of low partial oxygen pressure, based on a temperature profile according to nickel and barium titanate, to produce a capacitor body 11.

The produced capacitor body 11 has a band-shaped concaved part 11b', formed only at and along the length-direction edges of one side and the other side in the height direction, and the areas of one side and the other side in the height direction, except for the concaved part 11b', constitute a roughly flat planar part 11a' (refer to FIG. 14). This concaved part 11b' is formed in the unsintered laminated-sheet production step, specifically by utilizing the fact that, compared to the area where the adjacent internal electrode layers 11c are facing each other in the height direction, in other areas the height dimension is more likely to decrease at the time of thermal bonding or final thermal bonding. Among the methods to form such concaved part 11b', the final thermal bonding method using a hot hydrostatic press, or final thermal bonding method using a mechanical or hydraulic press with an elastic plate made of synthetic rubber contacting both sides in the height direction, is favorably adopted.

Then, by using a roller coater, dip coater, or other coating machine and a drying machine, a metal paste (the aforementioned metal paste is carried over) is coated onto both ends of the capacitor body 11 in the length direction and then dried, after which the paste is baked in an ambience similar to the ones mentioned above, to produce a base conductor layer 12a (refer to FIG. 15). When producing a base conductor layer 12a, one part is formed on the end face of the capacitor body 11 in the length direction, height-direction wrap-around part 12a1 is formed inside the concaved part 11b', and width-direction wrap-around part 12a2 is formed at the ends of one side and the other side of the capacitor body 11 in the width direction, while the thickness of the height-direction wrap-around part 12a1 is adjusted as close as possible to the depth of the concaved part 11b', as shown in FIG. 23 and FIG. 24. If the thickness of the height-direction wrap-around part 12a1 is markedly larger or smaller than the depth of the concaved part 11b', the viscosity of the metal paste used can be adjusted to adjust the thickness. If the thickness of the height-direction wrap-around part 12a1 is markedly larger than the depth of the concaved part 11b', the thickness can also be adjusted by scraping off any excess of the applied metal paste or by polishing off any excess part of the base conductor layer 12a that has been produced.

Then, a main conductor layer 12c is produced in such a way that the part covering the end face of the base conductor layer 12a in the length direction, surface of the height-direction wrap-around part 12a1 of the base conductor layer 12a and height-direction wrap-around part 12c1 positioned on one side and the other side of the capacitor body 11 in the height direction, and surface of the width-direction wrap-around part 12a2 of the base conductor layer 12a and width-direction wrap-around part 12c2 positioned on one side and the other side of the capacitor body 11 in the width direction, become continuous to each other. Among the methods to produce such main conductor layer 12c, the sputtering method, vacuum deposition method, or other gas phase method is favorably adopted.

Next, the effects obtained by the laminated ceramic capacitor 10-4 shown in FIG. 22 through FIG. 24 are explained (E41 and E42 below are symbols indicating effects).

(E41) The height-direction wrap-around part 12c1 of the main conductor layer 12c of each external electrode 12 has a planar connecting area CA constituted by a surface area over the height-direction wrap-around part 12a1 of the base conductor layer 12a and a surface area over the planar part 11a of the capacitor body 11, so this connecting area CA can be utilized to reliably connect conductor pads and conductor vias. When connecting the connecting area CA to a conductor pad via solder, for example, the clearance from the conductor pad remains roughly uniform because the connecting area CA is free from marked height gaps or undulations unlike before, and consequently connection failure due to uneven amounts of solder can be prevented. Also, when connecting the connecting area CA to a conductor via, a sufficient area to connect the conductor via can be ensured because the connecting area CA is free from marked height gaps or undulations unlike before, and consequently connection failure due to position tolerance of the conductor via can be prevented.

(E42) The length of the width-direction wrap-around part 12c2 of the main conductor layer 12c of each external electrode 12 is equivalent to the length of the height-direction wrap-around part 12c1 (refer to FIG. 22 and FIG. 23A), which ensures a form in which around 40 to 80% of the entire surface of the capacitor body 11 is covered by the very flexible main conductor layer 12c and this improves the breaking strength of the laminated ceramic capacitor 10-4.

Fifth Embodiment (FIG. 25 Through FIG. 27)

First, the structure of a laminated ceramic capacitor 10-5 to which the present invention is applied, is explained by citing FIG. 25 through FIG. 27. Incidentally, FIG. 25 shows both one side and the other side of the laminated ceramic capacitor 10-5 in the height direction, FIG. 26A shows both one side and the other side of the laminated ceramic capacitor 10-5 in the width direction, and FIG. 27A shows both one side and the other side of the laminated ceramic capacitor 10-5 in the length direction.

The laminated ceramic capacitor 10-5 shown in FIG. 25 through FIG. 27 is structurally different from the aforementioned laminated ceramic capacitor 10-1 (first embodiment) in the following point:

At the height-direction wrap-around part 12c1 of the main conductor layer 12c, the part (no symbol) longer than the width-direction wrap-around part 12c2 continuously has a ridgeline covering part 12c3, along both width-direction edges of the longer part, covering the length-direction ridgeline of the capacitor body 11 (refer to FIG. 25 through FIG. 27).

The remainder of the structure is the same as with the aforementioned laminated ceramic capacitor 10-1 (first embodiment) and therefore not explained.

Next, a preferred example of manufacturing method of the laminated ceramic capacitor 10-5 shown in FIG. 25 through FIG. 27 is explained by citing FIG. 4 through FIG. 8.

If the primary component of the internal electrode layer 11c of the capacitor body 11 is nickel and the primary component of the dielectric layer 11d and protective part is barium titanate, then first a metal paste containing nickel powder, terpineol (solvent), ethyl cellulose (binder), and additives such as dispersant, as well as a ceramic slurry containing barium titanate powder, ethanol (solvent), polyvinyl butyral (binder), and additives such as dispersant, are prepared.

Then, using a die coater, gravure coater, or other coating machine and a drying machine, the ceramic slurry is coated onto the surface of a carrier film and then dried, to produce a first green sheet. Also, using a screen printer, gravure printer, or other printing machine and a drying machine, the metal paste is printed in matrix or zigzag patterns onto the surface of the first green sheet and then dried, to produce a second green sheet on which internal electrode layer patterns are formed (refer to FIG. 4). FIG. 4 shows a second green sheet GS corresponding to one laminated ceramic capacitor 10-5, where a U-shaped margin MA exists in a manner enclosing one edge in the length direction, and both edges in the width direction, of the rectangular internal electrode layer pattern CP.

Then, using a movable pickup head with stamping blade and heater or other laminating machine, individual sheets stamped from the first green sheet are stacked together until a specified number is reached, after which the stacked sheets are thermally bonded to produce a part corresponding to the protective part. Next, individual sheets stamped from the second green sheet (sheets that include internal electrode layer patterns) are stacked together until a specified number is reached, after which the stacked sheets are thermally bonded to produce a part corresponding to the capacitance part. Next, using a hot hydrostatic press or mechanical or hydraulic press or other final bonding machine, the stacked parts are finally bonded thermally to produce an unsintered laminated sheet.

Then, using a blade dicing machine, laser dicing machine, or other cutting machine, the unsintered laminated sheet is cut in a lattice pattern to produce unsintered chips, each corresponding to a capacitor body 11. Then, using a tunnel-type sintering furnace, box-type sintering furnace, or other sintering machine, the many unsintered chips are sintered (and the binder is removed) in a reducing ambience or ambience of low partial oxygen pressure, based on a temperature profile according to nickel and barium titanate, to produce a capacitor body 11.

The produced capacitor body 11 has a concaved part 11b shaped like a rectangular frame, continuously formed along the length-direction edges and width-direction edges of one side and the other side in the height direction, and the areas of one side and the other side in the height direction, except for the concaved part 11b, constitute a roughly flat planar part 11a (refer to FIG. 5). This concaved part 11b is formed in the unsintered laminated-sheet production step, specifically by utilizing the fact that, compared to the area where the adjacent internal electrode layers 11c are facing each other in the height direction, in other areas the height dimension is more likely to decrease at the time of thermal bonding or final thermal bonding. Among the methods to form such concaved part 11b, the final thermal bonding method using a hot hydrostatic press, or final thermal bonding method using a mechanical or hydraulic press with an elastic plate made of synthetic rubber contacting both sides in the height direction, is favorably adopted.

Then, by using a roller coater, dip coater, or other coating machine and a drying machine, a metal paste (the aforementioned metal paste is carried over) is coated onto both ends of the capacitor body 11 in the length direction and then dried, after which the paste is baked in an ambience similar to the ones mentioned above, to produce a base conductor layer 12a (refer to FIG. 6). When producing a base conductor layer 12a, one part is formed on the end face of the capacitor body 11 in the length direction, height-direction wrap-around part 12a1 is formed inside the part, along the length-direction edges, of the concaved part 11b, and width-direction wrap-around part 12a2 is formed at the ends of one side and the other side of the capacitor body 11 in the width direction, while the thickness of the height-direction wrap-around part 12a1 is adjusted as close as possible to the depth of the concaved part 11b, as shown in FIG. 26 and FIG. 27. If the thickness of the height-direction wrap-around part 12a1 is markedly larger or smaller than the depth of the concaved part 11b, the viscosity of the metal paste used can be adjusted to adjust the thickness. If the thickness of the height-direction wrap-around part 12a1 is markedly larger than the depth of the concaved part 11b, the thickness can also be adjusted by scraping off any excess of the applied metal paste or by polishing off any excess part of the base conductor layer 12a that has been produced.

Then, a supplemental conductor layer 12b is produced in a manner continuing over the surface of the height-direction wrap-around part 12a1 of the base conductor layer 12a through the surface of the planar part 11a of the capacitor body 11 and interior surface of the part, along the width-direction edges, of the concaved part 11b (refer to FIG. 7). Among the methods to produce a thin supplemental conductor layer 12b, the method to spray a low-viscosity version of the aforementioned metal paste or other low-viscosity metal paste using a sprayer, etc., and then bake the metal paste in an ambience similar to the ones mentioned above, or method to form a thin nickel or non-nickel metal film using the sputtering method, vacuum deposition method, or other gas phase method, is favorably adopted. Also, if the thickness of the supplemental conductor layer 12b is several μm, a supplemental conductor layer 12b can be produced without problem according to the method to print the aforementioned metal paste or other metal paste using the screen printing method and then bake the metal paste in an ambience similar to the ones mentioned above. While FIG. 7 shows a supplemental conductor layer 12b whose length is equivalent to the length of the height-direction wrap-around part 12c1 of the main conductor layer 12c and whose width is equivalent to the width of the capacitor body 11 for the convenience of illustration, it is also permitted that, as mentioned above, the length of the supplemental conductor layer 12b is slightly shorter than the length of the height-direction wrap-around part 12c1 of the main conductor layer 12c (refer to FIG. 8A) and the width is slightly narrower than the width of the capacitor body 11 (refer to FIG. 8B).

Then, a main conductor layer 12c is produced in such a way that the part covering the end face of the base conductor layer 12a in the length direction, height-direction wrap-around part 12c1 positioned on the surface of the supplemental conductor layer 12b, and width-direction wrap-around part 12c2 positioned on the surface of the width-direction wrap-around part 12a2 of the base conductor layer 12a become continuous to each other. When producing a main conductor layer 12c, make sure a ridgeline covering part 12c3 that covers the length-direction ridgeline of the capacitor body 11 is continuously formed along both edges, in the width direction, of a part longer than the width-direction wrap-around part 12c2, at the height-direction wrap-around part 12c1 of the main conductor layer 12c, as shown in FIG. 25 through FIG. 27. Among the methods to produce this main conductor layer 12c, the electroplating method, sputtering method, vacuum deposition method, or other gas phase method is favorably adopted.

Next, the effects obtained by the laminated ceramic capacitor 10-5 shown in FIG. 25 through FIG. 27 are explained (E51 through E54 below are symbols indicating effects).

(E51) The height-direction wrap-around part 12c1 of the main conductor layer 12c of each external electrode 12 has a planar connecting area CA constituted by a surface area over the height-direction wrap-around part 12a1 of the base conductor layer 12a and a surface area over the planar part 11a of the capacitor body 11, so this connecting area CA can be utilized to reliably connect conductor pads and conductor vias. When connecting the connecting area CA to a conductor pad via solder, for example, the clearance from the conductor pad remains roughly uniform because the connecting area CA is free from marked height gaps or undulations unlike before, and consequently connection failure due to uneven amounts of solder can be prevented. Also, when connecting the connecting area CA to a conductor via, a sufficient area to connect the conductor via can be ensured because the connecting area CA is free from marked height gaps or undulations unlike before, and consequently connection failure due to position tolerance of the conductor via can be prevented.

(E52) The supplemental conductor layer 12b whose role is to supplement the adhesion of the height-direction wrap-around part 12c1 of the main conductor layer 12c to the capacitor body 11 is present between the height-direction wrap-around part 12c1 of the main conductor layer 12c of each external electrode 12 and one side or the other side of the capacitor body 11 in the height direction, so when utilizing the connecting area CA to connect a conductor pad or conductor via, or after the connection is completed, separation of the height-direction wrap-around part 12c1 of the main conductor layer 12c from the planar part 11a can be prevented. This supplemental conductor layer 12b is useful when the height-direction wrap-around part 12c1 of the main conductor layer 12c is directly formed on the capacitor body 11 and sufficient adhesive strength may not be obtained easily due to the surface roughness, material, or other aspect of the capacitor body 11.

(E53) The length of the width-direction wrap-around part 12c2 of the main conductor layer 12c of each external electrode 12 is shorter than the length of the height-direction wrap-around part 12c1 (refer to FIG. 25 and FIG. 26A), so areas that are not very relevant to the connection of the main conductor layer 12c to conductor pads and conductor vias can be eliminated to reduce the cost of materials for forming the main conductor layer 12c. Also, even when the laminated ceramic capacitor 10-5 receives deflection stress, any stress applied to the height-direction wrap-around part 12c1 of the main conductor layer 12c of each external electrode 12 can be dispersed and mitigated.

(E54) At the height-direction wrap-around part 12c1 of the main conductor layer 12c of each external electrode 12, the part (no symbol) longer than the width-direction wrap-around part 12c2 continuously has a ridgeline covering part 12c3, along both width-direction edges of the longer part, covering the length-direction ridgeline of the capacitor body 11, which means that, even when the laminated ceramic capacitor 10-5 undergoes expansion/contraction based on temperature shift, etc., generation of cracks along the location of the length-direction ridgeline of the capacitor body 11 due to stress associated with the expansion/contraction can be prevented, while the location of the length-direction ridgeline vulnerable to chipping can be protected with the ridgeline covering part 12c3.

Sixth Embodiment (FIG. 28 Through FIG. 30)

First, the structure of a laminated ceramic capacitor 10-6 to which the present invention is applied, is explained by citing FIG. 28 through FIG. 30. Incidentally, FIG. 28 shows both one side and the other side of the laminated ceramic capacitor 10-6 in the height direction, FIG. 29A shows both one side and the other side of the laminated ceramic capacitor 10-6 in the width direction, and FIG. 30A shows both one side and the other side of the laminated ceramic capacitor 10-6 in the length direction.

The laminated ceramic capacitor 10-6 shown in FIG. 28 through FIG. 30 is structurally different from the aforementioned laminated ceramic capacitor 10-1 (first embodiment) in the following points:

A concaved part 11b' is formed in a band shape only at and along the length-direction edges of one side and the other side of the capacitor body 11 in the height direction, and the areas of one side and the other side of the capacitor body 11 in the height direction, except for the concaved part 11b', provide a roughly flat planar part 11a' (refer to FIG. 28 through FIG. 30).

The supplemental conductor layer 12b is continuously formed over the surface of the height-direction wrap-around part 12a1 of the base conductor layer 12a through the surface of the planar part 11a' of one side and the other side of the capacitor body 11 in the height direction (refer to FIG. 28 through FIG. 30).

The height-direction wrap-around part 12c1 of the main conductor layer 12c is continuously formed over the surface of the supplemental conductor layer 12b, or in other words over the height-direction wrap-around part 12a1 of the base conductor layer 12a, through the planar part 11a of the capacitor body 11, and a roughly flat planar connecting area CA is constituted by a surface area over the height-direction wrap-around part 12a1 of the base conductor layer 12a and a surface area over the planar part 11a' (refer to FIG. 28 through FIG. 30).

At the height-direction wrap-around part 12c1 of the main conductor layer 12c, the part (no symbol) longer than the width-direction wrap-around part 12c2 continuously has a ridgeline covering part 12c3, along both width-direction edges of the longer part, covering the length-direction ridgeline of the capacitor body 11 (refer to FIG. 28 through FIG. 30).

The remainder of the structure is the same as with the aforementioned laminated ceramic capacitor 10-1 (first embodiment) and therefore not explained.

Next, a preferred example of manufacturing method of the laminated ceramic capacitor 10-6 shown in FIG. 28 through FIG. 30 is explained by citing FIG. 13 through FIG. 17.

If the primary component of the internal electrode layer 11c of the capacitor body 11 is nickel and the primary component of the dielectric layer 11d and protective part is barium titanate, then first a metal paste containing nickel powder, terpineol (solvent), ethyl cellulose (binder), and additives such as dispersant, as well as a ceramic slurry containing barium titanate powder, ethanol (solvent), polyvinyl butyral (binder), and additives such as dispersant, are prepared.

Then, using a die coater, gravure coater, or other coating machine and a drying machine, the ceramic slurry is coated onto the surface of a carrier film and then dried, to produce a first green sheet. Also, using a screen printer, gravure printer, or other printing machine and a drying machine, the metal paste is printed in matrix or zigzag patterns onto the surface of the first green sheet and then dried, while the ceramic slurry is coated onto the margins on both sides of each internal electrode layer pattern in the width direction and then dried, to produce a second green sheet on which internal electrode layer patterns are formed (refer to FIG. 13). FIG. 13 shows a second green sheet GS corresponding to one laminated ceramic capacitor 10-6, where a green sheet part GSa of equivalent thickness to the rectangular internal electrode layer pattern CP is formed on both sides of the pattern CP in the width direction, which means that a margin MA exists only along one length-direction edge of the second green sheet GS.

Then, using a movable pickup head with stamping blade and heater or other laminating machine, individual sheets stamped from the first green sheet are stacked together until a specified number is reached, after which the stacked sheets are thermally bonded to produce a part corresponding to the protective part. Next, individual sheets stamped from the second green sheet (sheets that include internal electrode layer patterns) are stacked together until a specified number is reached, after which the stacked sheets are thermally bonded to produce a part corresponding to the capacitance part. Next, using a hot hydrostatic press or mechanical or hydraulic press or other final bonding machine, the stacked parts are finally bonded thermally to produce an unsintered laminated sheet.

Then, using a blade dicing machine, laser dicing machine, or other cutting machine, the unsintered laminated sheet is cut in a lattice pattern to produce unsintered chips, each corresponding to a capacitor body 11. Then, using a tunnel-type sintering furnace, box-type sintering furnace, or other sintering machine, the many unsintered chips are sintered (and the binder is removed) in a reducing ambience or ambience of low partial oxygen pressure, based on a temperature profile according to nickel and barium titanate, to produce a capacitor body 11.

The produced capacitor body 11 has a band-shaped concaved part 11b', formed only at and along the length-direction edges of one side and the other side in the height direction, and the areas of one side and the other side in the height direction, except for the concaved part 11b', constitute a roughly flat planar part 11a' (refer to FIG. 14). This concaved part 11b' is formed in the unsintered laminated-sheet production step, specifically by utilizing the fact that, compared to the area where the adjacent internal electrode layers 11c are facing each other in the height direction, in other areas the height dimension is more likely to decrease at the time of thermal bonding or final thermal bonding. Among the methods to form such concaved part 11b', the final thermal bonding method using a hot hydrostatic press, or final thermal bonding method using a mechanical or hydraulic press with an elastic plate made of synthetic rubber contacting both sides in the height direction, is favorably adopted.

Then, by using a roller coater, dip coater, or other coating machine and a drying machine, a metal paste (the aforementioned metal paste is carried over) is coated onto both ends of the capacitor body 11 in the length direction and then dried, after which the paste is baked in an ambience similar to the ones mentioned above, to produce a base conductor layer 12a (refer to FIG. 15). When producing a base conductor layer 12a, one part is formed on the end face of the capacitor body 11 in the length direction, height-direction wrap-around part 12a1 is formed inside the concaved part 11b', and width-direction wrap-around part 12a2 is formed at the ends of one side and the other side of the capacitor body 11 in the width direction, while the thickness of the height-direction wrap-around part 12a1 is adjusted as close as possible to the depth of the concaved part 11b', as shown in FIG. 29 and FIG. 30. If the thickness of the height-direction wrap-around part 12a1 is markedly larger or smaller than the depth of the concaved part 11b', the viscosity of the metal paste used can be adjusted to adjust the thickness. If the thickness of the height-direction wrap-around part 12a1 is markedly larger than the depth of the concaved part 11b', the thickness can also be adjusted by scraping off any excess of the applied metal paste or by polishing off any excess part of the base conductor layer 12a that has been produced.

Then, a supplemental conductor layer 12b is produced in a manner continuing over the surface of the height-direction wrap-around part 12a1 of the base conductor layer 12a through the surface of the planar part 11a' of the capacitor body 11 (refer to FIG. 16). Among the methods to produce a thin supplemental conductor layer 12b, the method to spray a low-viscosity version of the aforementioned metal paste or other low-viscosity metal paste using a sprayer, etc., and then bake the metal paste in an ambience similar to the ones mentioned above, or method to form a thin nickel or non-nickel metal film using the sputtering method, vacuum deposition method, or other gas phase method, is favorably adopted. Also, if the thickness of the supplemental conductor layer 12b is several μm, a supplemental conductor layer 12b can be produced without problem according to the method to print the aforementioned metal paste or other metal paste using the screen printing method and then bake the metal paste in an ambience similar to the ones mentioned above. While FIG. 16 shows a supplemental conductor layer 12b whose length is equivalent to the length of the height-direction wrap-around part 12c1 of the main conductor layer 12c and whose width is equivalent to the width of the capacitor body 11 for the convenience of illustration, it is also permitted that, as mentioned above, the length of the supplemental conductor layer 12b is slightly shorter than the length of the height-direction wrap-around part 12c1 of the main conductor layer 12c (refer to FIG. 17A) and the width is slightly narrower than the width of the capacitor body 11 (refer to FIG. 17B).

Then, a main conductor layer 12c is produced in such a way that the part covering the end face of the base conductor layer 12a in the length direction, height-direction wrap-around part 12c1 positioned on the surface of the supplemental conductor layer 12b, and width-direction wrap-around part 12c2 positioned on the surface of the width-direction wrap-around part 12a2 of the base conductor layer 12a become continuous to each other. When producing a main conductor layer 12c, make sure a ridgeline covering part 12c3 that covers the length-direction ridgeline of the capacitor body 11 is continuously formed along both edges, in the width direction, of a part longer than the width-direction wrap-around part 12c2, at the height-direction wrap-around part 12c1 of the main conductor layer 12c, as shown in FIG. 28 through FIG. 30. Among the methods to produce this main conductor layer 12c, the electroplating method, sputtering method, vacuum deposition method, or other gas phase method is favorably adopted.

Next, the effects obtained by the laminated ceramic capacitor 10-6 shown in FIG. 28 through FIG. 30 are explained (E61 through E64 below are symbols indicating effects).

(E61) The height-direction wrap-around part 12c1 of the main conductor layer 12c of each external electrode 12 has a planar connecting area CA constituted by a surface area over the height-direction wrap-around part 12a1 of the base conductor layer 12a and a surface area over the planar part 11a' of the capacitor body 11, so this connecting area CA can be utilized to reliably connect conductor pads and conductor vias. When connecting the connecting area CA to a conductor pad via solder, for example, the clearance from the conductor pad remains roughly uniform because the connecting area CA is free from marked height gaps or undulations unlike before, and consequently connection failure due to uneven amounts of solder can be prevented. Also, when connecting the connecting area CA to a conductor via, a sufficient area to connect the conductor via can be ensured because the connecting area CA is free from marked height gaps or undulations unlike before, and consequently connection failure due to position tolerance of the conductor via can be prevented.

(E62) The supplemental conductor layer 12b whose role is to supplement the adhesion of the height-direction wrap-around part 12c1 of the main conductor layer 12c to the capacitor body 11 is present between the height-direction wrap-around part 12c1 of the main conductor layer 12c of each external electrode 12 and one side or the other side of the capacitor body 11 in the height direction, so when utilizing the connecting area CA to connect a conductor pad or conductor via, or after the connection is completed, separation of the height-direction wrap-around part 12c1 of the main conductor layer 12c from the planar part 11a can be prevented. This supplemental conductor layer 12b is useful when the height-direction wrap-around part 12c1 of the main conductor layer 12c is directly formed on the capacitor body 11 and sufficient adhesive strength may not be obtained easily due to the surface roughness, material, or other aspect of the capacitor body 11.

(E63) The length of the width-direction wrap-around part 12c2 of the main conductor layer 12c of each external electrode 12 is shorter than the length of the height-direction wrap-around part 12c1 (refer to FIG. 28 and FIG. 29A), so areas that are not very relevant to the connection of the main conductor layer 12c to conductor pads and conductor vias can be eliminated to reduce the cost of materials for forming the main conductor layer 12c. Also, even when the laminated ceramic capacitor 10-6 deflects due to external force, etc., any stress applied to the height-direction wrap-around part 12c1 of the main conductor layer 12c of each external electrode 12 can be dispersed.

(E64) At the height-direction wrap-around part 12c1 of the main conductor layer 12c of each external electrode 12, the part (no symbol) longer than the width-direction wrap-around part 12c2 continuously has a ridgeline covering part 12c3, along both width-direction edges of the longer part, covering the length-direction ridgeline of the capacitor body 11, which means that, even when the laminated ceramic capacitor 10-6 undergoes expansion/contraction based on temperature shift, etc., generation of cracks along the location of the length-direction ridgeline of the capacitor body 11 due to stress associated with the expansion/contraction can be prevented, while the location of the length-direction ridgeline vulnerable to chipping can be protected with the ridgeline covering part 12c3.

<<Supplemental Information Regarding Examples of Manufacturing Methods for First, Second, Fifth and Sixth Embodiments>>

(1) In the first, second, fifth, and sixth embodiments mentioned above, the respective examples of manufacturing methods explained a method where the thickness of the height-direction wrap-around part 12a1 of the base conductor layer 12a (including the thickness of the supplemental conductor layer 12b in FIG. 9 and FIG. 18) was adjusted as close as possible to the depth of the concaved part 11b or 11b'; however, if the electroplating method is adopted as a method for producing the main conductor layer 12c, a planar connecting area CA similar to the ones mentioned above can still be formed on the surface of the height-direction wrap-around part 12c1 of the main conductor layer 12c by using a rotary electroplating machine (refer to Japanese Patent Laid-open No. 2006-022399, for example) as a means thereof, even when the thickness of the height-direction wrap-around part 12a1 of the base conductor layer 12a is slightly different from the depth of the concaved part 11b or 11b'. This is explained below by citing FIG. 31.

FIG. 31A is a section view corresponding to FIG. 2C, FIG. 10C, FIG. 26C, and FIG. 29C, illustrating a case where the thickness of the height-direction wrap-around part 12a1 of the base conductor layer 12a is slightly larger than the depth of the concaved part 11b or 11b'. On the other hand, FIG. 31B is a section view corresponding to FIG. 9 and FIG. 18, illustrating a case where the thickness of the height-direction wrap-around part 12a1 of the base conductor layer 12a is slightly smaller than the depth of the concaved part 11b or 11b'. Incidentally, the two-dot chain lines shown in FIG. 31A and FIG. 31B indicate the interior surface IF of a rotary container constituting a rotary electroplating machine. While the interior surface IF is oriented horizontally in the figures for the purpose of illustration, the interior surface IF represents a vertical interior surface continuing from the bottom surface of the rotary container.

The rotary electroplating machine electrolytically plates each of the many works introduced into its rotary container, in a desired manner, by continuously supplying plating solution into the rotary container that turns, and by supplying electrical current between the electrodes inserted into the rotary container and the rotary container. The rotary container turns in a mode where constant-speed turning and deceleration are repeated sequentially, a mode where constant-speed turning and stopping are repeated sequentially, or a mode where constant-speed turning and deceleration or stopping in one direction and constant-speed turning and deceleration or stopping in another direction are repeated sequentially.

In other words, when many capacitor bodies 11 completing the production of base conductor layer 12a and supplemental conductor layer 12b are introduced into the rotary container of the aforementioned rotary electroplating machine and the rotary container is turned at constant speed, each capacitor body 11 moves from the bottom surface to interior surface IF of the rotary container due to centrifugal force and its planar part 11a or 11a' faces the interior surface IF, as shown in FIG. 31A and FIG. 31B. To be specific, the supplemental conductor layer 12b present over the two height-direction wrap-around parts 12a1 of the base conductor layer 12a are in contact with the interior surface IF in the case of FIG. 31A, while the supplemental conductor layer 12b present over the planar part 11a or 11a' of the capacitor body 11 is in contact with the interior surface IF in the case of FIG. 31B, as the desired electroplating is performed.

The plating thickness of the main conductor layer 12c in an area contacting the interior surface IF becomes thinner, while the plating thickness of the main conductor layer 12c in an area not contacting the interior surface IF becomes thicker, as electroplating is performed in the aforementioned condition, so a planar connecting area CA similar to the ones mentioned above can still be formed on the surface of the height-direction wrap-around part 12c1 of the main conductor layer 12c, even when the thickness of the height-direction wrap-around part 12a1 of the base conductor layer 12a is slightly different from the depth of the concaved part 11b or 11b'. According to experiments, it was confirmed that, with the laminated ceramic capacitors 10-1, 10-2, 10-5, and 10-6 explained in the aforementioned first, second, fifth, and sixth embodiments, a main conductor layer 12c could be produced which had a height-direction wrap-around part 12a1 whose thickness was adjusted to absorb the difference GA between the thickness of the height-direction wrap-around part 12a1 of the base conductor layer 12a (including the thickness of the supplemental conductor layer 12b in FIG. 31B) and the depth of the concaved part 11b or 11b' when the difference GA was 5 μm or less.

Other Embodiments (M51) While the first through sixth embodiments mentioned above showed a laminated ceramic capacitor 10-1 through 10-6 whose length L was 1000 μm, width W was 500 μm, and height H was 100 μm (all are reference dimensions not including tolerance), effects similar to the ones mentioned above can also be achieved with a laminated ceramic capacitor whose reference dimensions are different from these values, or a laminated ceramic capacitor having less than 6 or more than 60 internal electrode layers 11c.

(M52) While the first through sixth embodiments mentioned above showed external electrodes 12 having one main conductor layer 12c, effects similar to the ones mentioned above can also be achieved when each external electrode 12 is produced by forming one additional main conductor layer on the surface of a main conductor layer 12c, or when each external electrode is produced by forming two or more additional main conductor layers on the surface of a main conductor layer 12c.

(M53) While the first through sixth embodiments mentioned above showed an application of the present invention to a laminated ceramic capacitor, effects similar to the ones mentioned above can also be achieved by applying the present invention to a laminated ceramic inductor, laminated ceramic varistor, or other laminated ceramic electronic component.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2014-246559, filed Dec. 5, 2014, and Japanese Patent Application No. 2015-071461, filed Mar. 31, 2015, each disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A laminated ceramic electronic component constituted by a component body of laminate structure and external electrodes provided thereon, wherein:

the component body has a shape of roughly a rectangular solid defined by a length, width, and height, with a concaved part formed at and along edges of a one side and other side in a height direction, said concaved part being constituted by a recess having a sidewall and a planar bottom continuously extending in a length direction from the edge of the one side, and another recess having a sidewall and a planar bottom continuously extending in the length direction from the edge of the other side;

the external electrodes each have a base conductor layer whose height-direction wrap-around part is formed inside the concaved part of the component body, and a main conductor layer whose height-direction wrap-around part is formed continuously over the height-direction wrap-around part of the base conductor layer through a planar part, except for the concaved part, of the one side and the other side of the component body in the height direction; and the height-direction wrap-around part of the main conductor layer has a planar connecting area constituted by a first area over a surface of the height-direction wrap-around part of the base conductor layer and a second area, without overlapping the first area in the height direction, over a surface of the planar part of the component body, wherein the first area is shorter than the second area in the length direction, and a width of the first area is wider than a width of the second area.

2. A laminated ceramic electronic component according to claim 1, wherein a supplemental conductor layer whose role is to supplement adhesion of the height-direction wrap-around part of the main conductor layer to the component body is present between the height-direction wrap-around part of the main conductor layer and the one side or the other side of the component body in the height direction.

3. A laminated ceramic electronic component according to claim 2, wherein the concaved part is continuously formed over length-direction edges and width-direction edges of the one side and the other side of the component body in the height direction.

4. A laminated ceramic electronic component according to claim 2, wherein the concaved part is formed only at and along length-direction edges of the one side and the other side of the component body in the height direction.

5. A laminated ceramic electronic component according to claim 2, wherein the main conductor layer has a width-direction wrap-around part that continues to the height-direction wrap-around part, and a length of the width-direction wrap-around part of the main conductor layer is shorter than a length of the height-direction wrap-around part of the main conductor layer.

6. A laminated ceramic electronic component according to claim 5, wherein, at the height-direction wrap-around part, a part longer than the width-direction wrap-around part continuously has a ridgeline covering part that covers a length-direction ridgeline of the component body.

7. A laminated ceramic electronic component according to claim 2, wherein the main conductor layer has a width-direction wrap-around part that continues to the height-direction wrap-around part, and a length of the width-direction wrap-around part is equivalent to a length of the height-direction wrap-around part.

8. A laminated ceramic electronic component according to claim 1, wherein the concaved part is continuously formed over length-direction edges and width-direction edges of the one side and the other side of the component body in the height direction.

9. A laminated ceramic electronic component according to claim 8, wherein the main conductor layer has a width-direction wrap-around part that continues to the height-direction wrap-around part, and a length of the width-direction wrap-around part of the main conductor layer is shorter than a length of the height-direction wrap-around part of the main conductor layer.

10. A laminated ceramic electronic component according to claim 9, wherein, at the height-direction wrap-around part, a part longer than the width-direction wrap-around part continuously has a ridgeline covering part that covers a length-direction ridgeline of the component body.

11. A laminated ceramic electronic component according to claim 8, wherein the main conductor layer has a width-direction wrap-around part that continues to the height-direction wrap-around part, and a length of the width-direction wrap-around part is equivalent to a length of the height-direction wrap-around part.

12. A laminated ceramic electronic component according to claim 1, wherein the concaved part is formed only at and along length-direction edges of the one side and the other side of the component body in the height direction.

13. A laminated ceramic electronic component according to claim 12, wherein the main conductor layer has a width-direction wrap-around part that continues to the height-direction wrap-around part, and a length of the width-direction wrap-around part of the main conductor layer is shorter than a length of the height-direction wrap-around part of the main conductor layer.

14. A laminated ceramic electronic component according to claim 13, wherein, at the height-direction wrap-around part, a part longer than the width-direction wrap-around part continuously has a ridgeline covering part that covers a length-direction ridgeline of the component body.

15. A laminated ceramic electronic component according to claim 12, wherein the main conductor layer has a width-direction wrap-around part that continues to the height-direction wrap-around part, and a length of the width-direction wrap-around part is equivalent to a length of the height-direction wrap-around part.

16. A laminated ceramic electronic component according to claim 1, wherein the main conductor layer has a width-direction wrap-around part that continues to the height-direction wrap-around part, and a length of the width-direction wrap-around part of the main conductor layer is shorter than a length of the height-direction wrap-around part of the main conductor layer.

17. A laminated ceramic electronic component according to claim 16, wherein, at the height-direction wrap-around part, a part longer than the width-direction wrap-around part continuously has a ridgeline covering part that covers a length-direction ridgeline of the component body.

18. A laminated ceramic electronic component according to claim 1, wherein the main conductor layer has a width-direction wrap-around part that continues to the height-direction wrap-around part, and a length of the width-direction wrap-around part is equivalent to a length of the height-direction wrap-around part.

* * * * *